(12) United States Patent
Simpson et al.

(10) Patent No.: US 12,502,713 B2
(45) Date of Patent: Dec. 23, 2025

(54) POROUS METAL COUPON WITH SEALED CAVITY FOR REPAIRING COMPONENT, COMPONENT WITH SAME AND RELATED METHOD

(71) Applicant: GE Infrastructure Technology LLC, Greenville, SC (US)

(72) Inventors: Stanley Frank Simpson, Greenville, SC (US); Jacob Andrew Salm, Simpsonville, SC (US); James Warren Pemrick, Troy, NY (US); Mark Lawrence Hunt, Greenville, SC (US); Nathan Nicholas Ostrout, Greenville, SC (US)

(73) Assignee: GE Infrastructure Technology LLC, Greenville, SC (US)

( * ) Notice: Subject to any disclaimer, the term of this patent is extended or adjusted under 35 U.S.C. 154(b) by 72 days.

(21) Appl. No.: 18/495,817

(22) Filed: Oct. 27, 2023

(65) Prior Publication Data

US 2025/0135547 A1    May 1, 2025

(51) Int. Cl.
*B22F 10/38*    (2021.01)
*B22F 7/06*    (2006.01)
(Continued)

(52) U.S. Cl.
CPC .............. *B22F 10/38* (2021.01); *B22F 7/062* (2013.01); *B22F 10/60* (2021.01); *B23K 1/0018* (2013.01);
(Continued)

(58) Field of Classification Search
None
See application file for complete search history.

(56) References Cited

U.S. PATENT DOCUMENTS 3,031,996 A    5/1962    Botvin
4,195,764 A    4/1980    Bogart
(Continued)

FOREIGN PATENT DOCUMENTS

CN    113430414 A    9/2021
DE    102018218017 A1    4/2020
(Continued)

OTHER PUBLICATIONS

EP Search Report for EP Application No. 24204162.2, dated Mar. 14, 2025, 11 pages.
(Continued)

*Primary Examiner* — Elizabeth Collister
(74) *Attorney, Agent, or Firm* — James Pemrick; Charlotte Wilson; Hoffman Warnick LLC

(57) ABSTRACT

A metal coupon for repairing a component includes an additively manufactured (AM) metal member having a sealed cavity in an interior of the AM metal member, and a porous region around the sealed cavity. A metal coupon system may include at least two AM metal parts with each AM metal part including at least a section of a sealed cavity therein and a porous region around the at least section of the sealed cavity. The AM metal parts combine to form the metal coupon, i.e., AM metal member, with the sealed cavity in an interior thereof and the porous region around the sealed cavity. In any event, the sealed cavity is hollow. The metal coupon with the sealed cavity provides reduced mass and allows braze material to be directed based on characteristics of the porous region of the metal coupon.

27 Claims, 18 Drawing Sheets

(51) Int. Cl.
- *B22F 10/60* (2021.01)
- *B23K 1/00* (2006.01)
- *B33Y 10/00* (2015.01)
- *B33Y 40/20* (2020.01)
- *B33Y 50/00* (2015.01)
- *B33Y 80/00* (2015.01)

(52) U.S. Cl.
CPC .............. *B33Y 10/00* (2014.12); *B33Y 40/20* (2020.01); *B33Y 50/00* (2014.12); *B33Y 80/00* (2014.12); *B22F 2998/10* (2013.01)

(56) References Cited

U.S. PATENT DOCUMENTS

| | | | |
|---|---|---|---|
| 5,156,321 | A | 10/1992 | Liburdi et al. |
| 5,775,402 | A | 7/1998 | Sachs et al. |
| 6,199,746 | B1 | 3/2001 | Dupree et al. |
| 6,413,650 | B1 | 7/2002 | Dupree et al. |
| 6,530,280 | B2 | 3/2003 | Schmermund et al. |
| 7,635,078 | B2 | 12/2009 | Ariga et al. |
| 8,042,723 | B2 | 10/2011 | Holi |
| 9,873,171 | B2 | 1/2018 | Li et al. |
| 10,228,138 | B2 | 3/2019 | Theuer et al. |
| 10,384,787 | B2 | 8/2019 | Gordon et al. |
| 10,456,849 | B2 | 10/2019 | Eminoglu |
| 10,767,489 | B2 | 9/2020 | Bunker |
| 10,975,719 | B2 | 4/2021 | Ucok et al. |
| 11,001,002 | B2 | 5/2021 | Kulinsky |
| 11,577,317 | B2 | 2/2023 | Hart et al. |
| 11,712,738 | B2 | 8/2023 | Ozbaysal et al. |
| 2007/0084047 | A1 | 4/2007 | Lange et al. |
| 2009/0229101 | A1 | 9/2009 | Ahmad |
| 2010/0239412 | A1 | 9/2010 | Draper |
| 2011/0099810 | A1 | 5/2011 | Stankowski et al. |
| 2012/0003086 | A1 | 1/2012 | Morris et al. |
| 2013/0086785 | A1 | 4/2013 | Cui et al. |
| 2013/0104397 | A1 | 5/2013 | Bunker |
| 2014/0020823 | A1 | 1/2014 | Montross |
| 2014/0111956 | A1 | 4/2014 | Taniguchi |
| 2014/0259666 | A1 | 9/2014 | Baughman et al. |
| 2014/0321994 | A1 | 10/2014 | Brzek |
| 2015/0093566 | A1 | 4/2015 | Bell |
| 2015/0147164 | A1 | 5/2015 | Cui et al. |
| 2015/0283642 | A1 | 10/2015 | Forsdike et al. |
| 2016/0059364 | A1 | 3/2016 | Huxol |
| 2016/0090848 | A1 | 3/2016 | Engeli et al. |
| 2016/0115571 | A1 | 4/2016 | Kestler et al. |
| 2016/0214176 | A1 | 7/2016 | Bruck et al. |
| 2016/0325368 | A1 | 11/2016 | Landwehr et al. |
| 2017/0284206 | A1 | 10/2017 | Roberts |
| 2017/0328207 | A1 | 11/2017 | Bunker |
| 2018/0010457 | A1 | 1/2018 | Chabane et al. |
| 2018/0010458 | A1 | 1/2018 | Chabane et al. |
| 2018/0023403 | A1* | 1/2018 | Jones ............... F01D 5/141 415/115 |
| 2018/0161902 | A1 | 6/2018 | Cui et al. |
| 2018/0180329 | A9 | 6/2018 | Conrad et al. |
| 2018/0187564 | A1 | 7/2018 | Cui et al. |
| 2018/0200817 | A1 | 7/2018 | Henderson et al. |
| 2018/0320270 | A1 | 11/2018 | Nardi |
| 2018/0339354 | A1 | 11/2018 | Eminoglu et al. |
| 2018/0345415 | A1 | 12/2018 | Whims |
| 2019/0054567 | A1 | 2/2019 | Roerig et al. |
| 2019/0284942 | A1 | 9/2019 | Tanigawa et al. |
| 2019/0329344 | A1 | 10/2019 | Eminoglu et al. |
| 2019/0345826 | A1 | 11/2019 | Packer et al. |
| 2020/0047253 | A1 | 2/2020 | Thomas et al. |
| 2020/0072078 | A1 | 3/2020 | Decesare et al. |
| 2020/0149403 | A1 | 5/2020 | Kottilingam et al. |
| 2020/0254548 | A1 | 8/2020 | Xu et al. |
| 2020/0384560 | A1 | 12/2020 | Rebbecchi, Jr. et al. |
| 2021/0114110 | A1 | 4/2021 | Sercombe et al. |
| 2021/0146459 | A1 | 5/2021 | Gold et al. |
| 2021/0146485 | A1 | 5/2021 | Bulgrin et al. |
| 2021/0154956 | A1 | 5/2021 | Schubel et al. |
| 2022/0136395 | A1 | 5/2022 | Ozbaysal et al. |
| 2022/0234101 | A1 | 7/2022 | Ozbaysal et al. |
| 2022/0402031 | A1 | 12/2022 | Hann et al. |
| 2025/0135588 | A1 | 5/2025 | Salm et al. |

FOREIGN PATENT DOCUMENTS

| | | |
|---|---|---|
| EP | 1074331 A1 | 2/2001 |
| EP | 2450471 A1 | 5/2012 |
| EP | 3360637 A1 | 8/2018 |
| EP | 3508686 A1 | 7/2019 |
| EP | 3693115 A1 | 8/2020 |
| TW | I670166 B | 9/2019 |
| WO | 2020014677 A1 | 1/2020 |
| WO | 2020145971 A1 | 7/2020 |
| WO | 2021247970 A1 | 12/2021 |

OTHER PUBLICATIONS

Final Office Action for related U.S. Appl. No. 18/495,803, dated Mar. 19, 2025, 26 pages.
Non-Final Office Action dated May 9, 2025 for related U.S. Appl. No. 18/495,808, 16 pages.
Non-Final Office Action issued in U.S. Appl. No. 18/495,803, dated Nov. 14, 2024, 26 pages.
Non-Final Office Action dated Apr. 21, 2025 for related U.S. Appl. No. 18/495,816, 29 pages.
EP Search Report for EP Application No. 24204157.2, dated Mar. 14, 2025, 11 pages.
EP Search Report for EP Application No. 24204160.6, dated Apr. 16, 2025, 12 pages.
EP Search Report for EP Application No. 24204462.6, dated Apr. 1, 2025, 10 pages.
EP Search Report for EP Application No. 24204155.6, dated Apr. 2, 2025, 10 pages.
EP Search Report for EP Application No. 24204158.0, dated Mar. 19, 2025, 10 pages.
EP Search Report for EP Application No. 24204153.1, dated Mar. 3, 2025, 11 pages.
EP Search Report for EP Application No. 24204463.4, dated Apr. 22, 2025, 10 pages.
EP Search Report for EP Application No. 24204461.8, dated Mar. 14, 2025, 11 pages.
EP Search Report for EP Application No. 24204154.9, dated Mar. 19, 2025, 13 pages.
EP Search Report for EP Application No. 24204161.4, dated Mar. 14, 2025, 14 pages.
EP Search Report for EP Application No. 24204156.4, dated Mar. 18, 2025, 13 pages.
Office Action (Non-Final Rejection) dated Jul. 28, 2025 for U.S. Appl. No. 18/417,625 (pp. 1-16).
Office Action (Final Rejection) dated Aug. 8, 2025 for U.S. Appl. No. 18/495,816 (pp. 1-15).
Office Action (Non-Final Rejection) dated Aug. 11, 2025 for U.S. Appl. No. 18/495,809 (pp. 1-13).
Office Action (Non-Final Rejection) dated Aug. 12, 2025 for U.S. Appl. No. 18/495,810 (pp. 1-14).
EP Search Report for EP Application No. 24223562.0, dated Jul. 8, 2025, 7 pages.
Office Action (Non-Final Rejection) dated Sep. 4, 2025 for U.S. Appl. No. 18/495,818 (pp. 1-13).
Office Action (Final Rejection) dated Sep. 26, 2025 for related U.S. Appl. No. 18/495,808, 17 pages.

* cited by examiner

POROUS METAL COUPON WITH SEALED CAVITY FOR REPAIRING COMPONENT, COMPONENT WITH SAME AND RELATED METHOD

TECHNICAL FIELD

The disclosure relates generally to component repair, and more specifically, to component repair using a porous metal coupon with a sealed cavity.

BACKGROUND

Industrial components occasionally require repair. For example, hot gas path components that are used in turbomachines to direct a working fluid to create energy may require repair. Hot gas path components can take a variety of forms, such as turbine rotor blades or stationary vanes, that include airfoils that direct a working fluid to create energy. Rotor blades are coupled to and act to turn a turbine rotor, and stationary vanes are coupled to a casing of the turbomachine to direct the working fluid towards the rotor blades.

Additive manufacturing, such as direct metal laser melting (DMLM) or selective laser melting (SLM), has emerged as a reliable manufacturing method for making industrial components. The advent of additive manufacturing techniques has also provided the ability to replace sections of components such as part of a leading or trailing edge of a turbomachine blade. For example, a portion of a leading edge of a turbomachine blade may be removed, leaving a cutout in the blade, and a new section (referred to herein as a "coupon") may be coupled to the blade in the cutout. The coupon is additively manufactured to have a shape that at least generally matches that of the cutout. The coupon can replace a worn section of a used turbomachine blade or be added as part of a new turbomachine blade. The coupon can simply replace internal cooling structures of the turbomachine blade, or may advantageously provide additional or improved cooling structures, e.g., near wall cooling passages, that were not provided in the original turbomachine blade.

However, replacement coupons are made with the same materials and exterior structure as the removed portion of the component. Consequently, the replacement coupons suffer from some of the same drawbacks as the original component and/or cutout with no improvement to general performance characteristics such as overall strength, stress/strain resistance, ductility, wear resistance, thermal or electrical conductivity, and/or decreased mass. A single braze material is used to couple the replacement coupon to the component, which prevents improving the general performance characteristics listed above and additional performance characteristics related to the joint, such as increasing joint adhesive bond strength and reliability, and decreasing required post-braze machining/blending. Using coupons that are materially identical to the removed cutouts also does not allow reduction in the high material cost for the replacement coupons.

BRIEF DESCRIPTION

All aspects, examples and features mentioned below can be combined in any technically possible way.

An aspect of the disclosure provides a metal coupon system for repairing a component, the metal coupon system comprising: at least two additively manufactured (AM) metal parts with each AM metal part including at least a section of a sealed cavity therein and a porous region around the at least section of the sealed cavity, wherein the at least two AM metal parts combine to form a metal coupon with the sealed cavity in an interior thereof and the porous region around the sealed cavity, wherein the sealed cavity is hollow.

Another aspect of the disclosure includes any of the preceding aspects, and the porous region has a variable porosity with two or more sub-regions having different porosities.

Another aspect of the disclosure includes a metal coupon for repairing a component, the metal coupon comprising: an additively manufactured (AM) metal member having a sealed cavity in an interior of the AM metal member and a porous region around the sealed cavity, wherein the sealed cavity is hollow.

Another aspect of the disclosure includes any of the preceding aspects, and the porous region has a variable porosity with two or more porous sub-regions having different porosities.

Another aspect of the disclosure includes any of the preceding aspects, and the porous region includes an outer porous sub-region adjacent an exterior surface of the AM metal member that has a higher porosity than an inner porous sub-region near the sealed cavity, wherein the outer porous sub-region is configured to accept more braze material therein than the inner porous sub-region.

Another aspect of the disclosure includes any of the preceding aspects, and the sealed cavity is defined within a braze material infiltration barrier, wherein the porous region is outside of the braze material infiltration barrier.

Another aspect of the disclosure includes any of the preceding aspects, and the AM metal member includes a first metal part including a first section of the sealed cavity defined therein and a second metal part including a second section of the sealed cavity defined therein, wherein the first and second metal parts are coupled using a braze material that infiltrates the porous region Another aspect of the disclosure includes any of the preceding aspects, and the AM metal member further includes an evacuation hole extending from an exterior surface of the AM metal member to the sealed cavity and configured to remove material from within the sealed cavity, and further comprising a sealing element in the evacuation hole to seal the evacuation hole.

Another aspect of the disclosure includes any of the preceding aspects, and a porosity of the porous region increases from near the sealed cavity towards an exterior surface of the AM metal member.

Another aspect of the disclosure includes any of the preceding aspects, and a porosity of the porous region increases in incremental steps from near the sealed cavity towards an exterior surface of the AM metal member.

An aspect of the disclosure includes a component, comprising: a body; an additively manufactured (AM) metal coupon having a sealed cavity in an interior of the AM metal coupon and a porous region around the sealed cavity, wherein the sealed cavity is hollow; and a braze material coupling the AM metal coupon in a coupon opening in the body, the braze material infiltrated into the porous region.

Another aspect of the disclosure includes any of the preceding aspects, and the porous region has a variable porosity with two or more porous sub-regions having different porosities.

Another aspect of the disclosure includes any of the preceding aspects, and the porous region includes an outer porous sub-region adjacent an exterior surface of the AM metal coupon that has a higher porosity than an inner porous sub-region near the sealed cavity, wherein the outer porous sub-region is configured to accept more braze material therein than the inner porous sub-region.

Another aspect of the disclosure includes any of the preceding aspects, and the sealed cavity is defined within a braze material infiltration barrier, wherein the porous region is outside of the braze material infiltration barrier.

Another aspect of the disclosure includes any of the preceding aspects, and the AM metal coupon includes a first metal part including a first section of the sealed cavity defined therein and a second metal part including a second section of the sealed cavity defined therein, wherein the braze material couples the first metal part and the second metal part of the AM metal coupon in the coupon opening in the body, creating the sealed cavity.

Another aspect of the disclosure includes any of the preceding aspects, and the AM metal coupon further includes an evacuation hole extending from an exterior surface of the AM metal coupon to the sealed cavity, and further comprising a sealing element in the evacuation hole to seal the evacuation hole.

Another aspect of the disclosure includes any of the preceding aspects, and a porosity of the porous region increases from the sealed cavity towards an exterior surface of the AM metal coupon.

Another aspect of the disclosure includes any of the preceding aspects, and a porosity of the porous region increases in incremental steps from the sealed cavity towards an exterior surface of the AM metal coupon.

An aspect of the disclosure includes a method of repairing a component, the method comprising: additively manufacturing a metal coupon, the metal coupon including a sealed cavity and a porous region around the sealed cavity; positioning the metal coupon in a coupon opening in a body of the component; and infiltrating the metal coupon with a braze material to couple the metal coupon in the coupon opening in the body with the sealed cavity therein, the braze material infiltrating into the porous region of the metal coupon, wherein the sealed cavity is hollow.

Another aspect of the disclosure includes any of the preceding aspects, and the porous region has a variable porosity with two or more porous sub-regions having different porosities.

Another aspect of the disclosure includes any of the preceding aspects, and the metal coupon has a near net shape of the coupon opening.

Another aspect of the disclosure includes any of the preceding aspects, and the additive manufacturing includes forming the porous region with an outer porous sub-region adjacent an exterior surface of the metal coupon that has a higher porosity than an inner porous sub-region of the metal coupon near the sealed cavity, and wherein, after the infiltrating, the outer porous sub-region includes more braze material therein than the inner porous sub-region.

Another aspect of the disclosure includes any of the preceding aspects, and the additive manufacturing includes forming the sealed cavity within a braze material infiltration barrier, wherein the porous region is outside of the braze material infiltration barrier.

Another aspect of the disclosure includes any of the preceding aspects, and the additive manufacturing includes additively manufacturing one or more metal parts, each metal part including at least a section of the sealed cavity and the porous region around the at least section of the sealed cavity, and wherein the positioning includes positioning the one or more metal parts in the coupon opening to provide the metal coupon.

Another aspect of the disclosure includes any of the preceding aspects, and the additive manufacturing includes additively manufacturing an entirety of the sealed cavity in a single-part metal coupon, the positioning includes positioning the single-part metal coupon in the coupon opening, and the infiltrating includes infiltrating the single-part metal coupon.

Another aspect of the disclosure includes any of the preceding aspects, and the additive manufacturing includes additively manufacturing the single-part metal coupon with an evacuation hole extending from an exterior surface of the single-part metal coupon to the sealed cavity and configured to remove material from within the sealed cavity, and further comprising removing material from within the sealed cavity using the evacuation hole, and further comprising sealing the evacuation hole with a sealing element.

Another aspect of the disclosure includes any of the preceding aspects, and further comprising, prior to the additive manufacturing: creating the coupon opening in the body of the component configured to receive the metal coupon; and creating a model of the coupon opening, wherein the additive manufacturing includes manufacturing the metal coupon such that the metal coupon has a near net shape of the coupon opening based on the model of the coupon opening.

Two or more aspects described in this disclosure, including those described in this summary section, may be combined to form implementations not specifically described herein. That is, all embodiments described herein can be combined with each other.

The details of one or more implementations are set forth in the accompanying drawings and the description below. Other features, objects and advantages will be apparent from the description and drawings, and from the claims.

BRIEF DESCRIPTION OF THE DRAWINGS

These and other features of this disclosure will be more readily understood from the following detailed description of the various aspects of the disclosure taken in conjunction with the accompanying drawings that depict various embodiments of the disclosure, in which.

Figure 1:
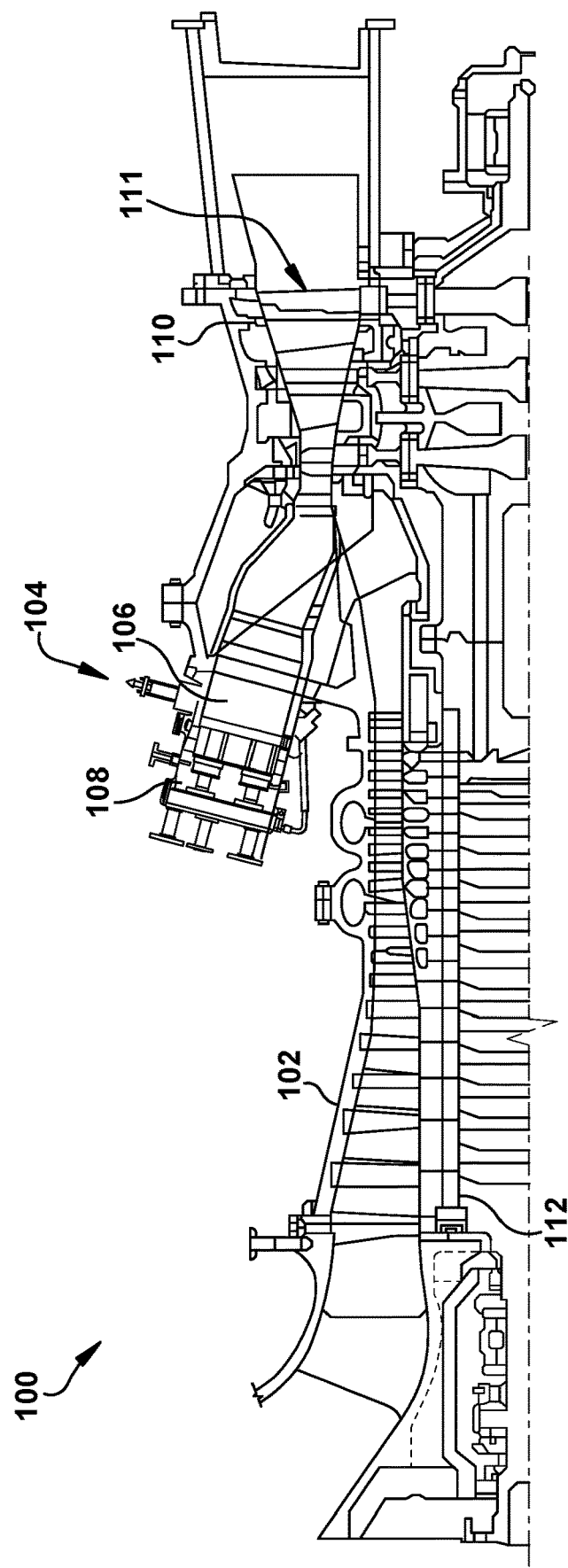
FIG. 1 shows a schematic view of an illustrative industrial machine in the form of a gas turbine system and including a component according to embodiments of the disclosure.

It is noted that the drawings of the disclosure are not necessarily to scale. The drawings are intended to depict only typical aspects of the disclosure and therefore should not be considered as limiting the scope of the disclosure. In the drawings, like numbering represents like elements between the drawings.

DETAILED DESCRIPTION

As an initial matter, in order to clearly describe the current disclosure, it will become necessary to select certain terminology when referring to and describing relevant machine components within the illustrative application of a turbomachine. When doing this, if possible, common industry terminology will be used and employed in a manner consistent with its accepted meaning. Unless otherwise stated, such terminology should be given a broad interpretation consistent with the context of the present application and the scope of the appended claims. Those of ordinary skill in the art will appreciate that often a particular component may be referred to using several different or overlapping terms. What may be described herein as being a single part may include and be referenced in another context as consisting of multiple components. Alternatively, what may be described herein as including multiple components may be referred to elsewhere as a single part.

In addition, several descriptive terms may be used regularly herein, and it should prove helpful to define these terms at the onset of this section. These terms and their definitions, unless stated otherwise, are as follows. As used herein, "downstream" and "upstream" are terms that indicate a direction relative to the flow of a fluid, such as the working fluid through the turbomachine or, for example, the flow of air through the combustor or coolant through one of the turbomachine's component systems. The term "downstream" corresponds to the direction of flow of the fluid, and the term "upstream" refers to the direction opposite to the flow. The terms "forward" and "aft," without any further specificity, refer to directions, with "forward" referring to the front or compressor end of the turbomachine, and "aft" referring to the rearward or turbine end of the turbomachine.

In addition, several descriptive terms may be used regularly herein, as described below. The terms "first," "second," and "third," may be used interchangeably to distinguish one component from another and are not intended to signify location or importance of the individual components.

The terminology used herein is for the purpose of describing particular embodiments only and is not intended to be limiting of the disclosure. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. "Optional" or "optionally" means that the subsequently described event may or may not occur or that the subsequently described feature may or may not be present and that the description includes instances where the event occurs, or the feature is present and instances where the event does not occur or the feature is not present.

Where an element or layer is referred to as being "on," "engaged to," "connected to," "coupled to," or "mounted to" another element or layer, it may be directly on, engaged, connected, coupled, or mounted to the other element or layer, or intervening elements or layers may be present. In contrast, when an element is referred to as being "directly on," "directly engaged to," "directly connected to," or "directly coupled to" another element or layer, there are no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items. The verb forms of "couple" and "mount" may be used interchangeably herein.

As indicated above, the disclosure provides a metal coupon for repairing a component. The metal coupon includes an additively manufactured (AM) metal member having a sealed cavity in an interior of the AM metal member and a porous region around the sealed cavity. The sealed cavity is hollow. The disclosure may also include a metal coupon system including at least two additively manufactured (AM) metal parts with each AM metal part including at least a section of a sealed cavity therein and a porous region around the at least section of the sealed cavity. The AM metal parts combine to form the metal coupon, i.e., the AM member, with the sealed cavity in an interior thereof and the porous region around the sealed cavity. A "coupon" as used herein may include any part positioned in a coupon opening in a body of the component as part of original manufacture of the component or to repair a part of the component, e.g., after a damaged part has been removed. A component may include a body and an additively manufactured (AM) metal coupon having the sealed cavity in an interior of the metal coupon and the porous region around the sealed cavity. The component may also include a braze material coupling the metal coupon in a coupon opening in the body. The braze material infiltrates into the porous region. The sealed cavity reduces the mass of the metal coupon. In addition, the porous region(s) of the metal coupon are configured to direct the flow of one or more braze materials in different ways to create different physical characteristics than previously possible, e.g., by directing more braze material where needed, directing braze material into special shapes and/or allowing use of more than one braze material. Where used for repair, the customized metal coupons do not suffer the same drawbacks as the original component and/or cutout and can be customized (with the braze material(s)) to, for example, change: joint adhesive bond strength, stress/strain resistance, ductility, wear resistance, oxidation resistance, thermal conductivity, electrical conductivity, surface roughness, hardness and/or mass, etc. One or more braze materials can be used to couple the replacement coupon to the component to also improve performance characteristics related to the joint, such as joint adhesive bond strength and reliability, and reducing required post-brazing machining/blending. Use of the porous metal coupon can also reduce material costs.

FIG. 1 shows a schematic illustration of an illustrative industrial machine, which may include a component according to teachings of the disclosure. In the example, the machine includes a turbomachine 100 in the form of a combustion or gas turbine (GT) system. Turbomachine 100 includes a compressor 102 and a combustor 104. Combustor 104 includes a combustion region 106 and a fuel nozzle assembly 108. Turbomachine 100 also includes a turbine assembly 110 and a common compressor/turbine shaft or rotor 112. In one embodiment, turbomachine 100 is a 7HA.03 engine, commercially available from GE Vernova. The present disclosure is not limited to any one particular GT system and may be implemented in connection with other engines including, for example, the other HA, F, B, LM, GT, TM and E-class engine models of GE Vernova, and engine models of other companies. Furthermore, the present disclosure is not limited to any particular turbomachine, and may be applicable to, for example, steam turbines, jet engines, compressors, turbofans, etc. Moreover, the present disclosure is not limited to any particular turbomachine component and may be applicable to any industrial component that employs coupons during manufacture or repair.

In operation, air flows through compressor 102 and compressed air is supplied to combustor 104. Specifically, the compressed air is supplied to fuel nozzle assembly 108 that is integral to combustor 104. Assembly 108 is in flow communication with combustion region 106. Fuel nozzle assembly 108 is also in flow communication with a fuel source (not shown in FIG. 1) and channels fuel and air to combustion region 106. Combustor 104 ignites and combusts fuel. Combustor 104 is in flow communication with turbine assembly 110 for which gas stream thermal energy is converted to mechanical rotational energy. Turbine assembly 110 includes a turbine 111 that rotatably couples to and drives rotor 112. Compressor 102 also is rotatably coupled to rotor 112. In the illustrative embodiment, there are a plurality of combustors and fuel nozzle assemblies 108.

Figure 2:
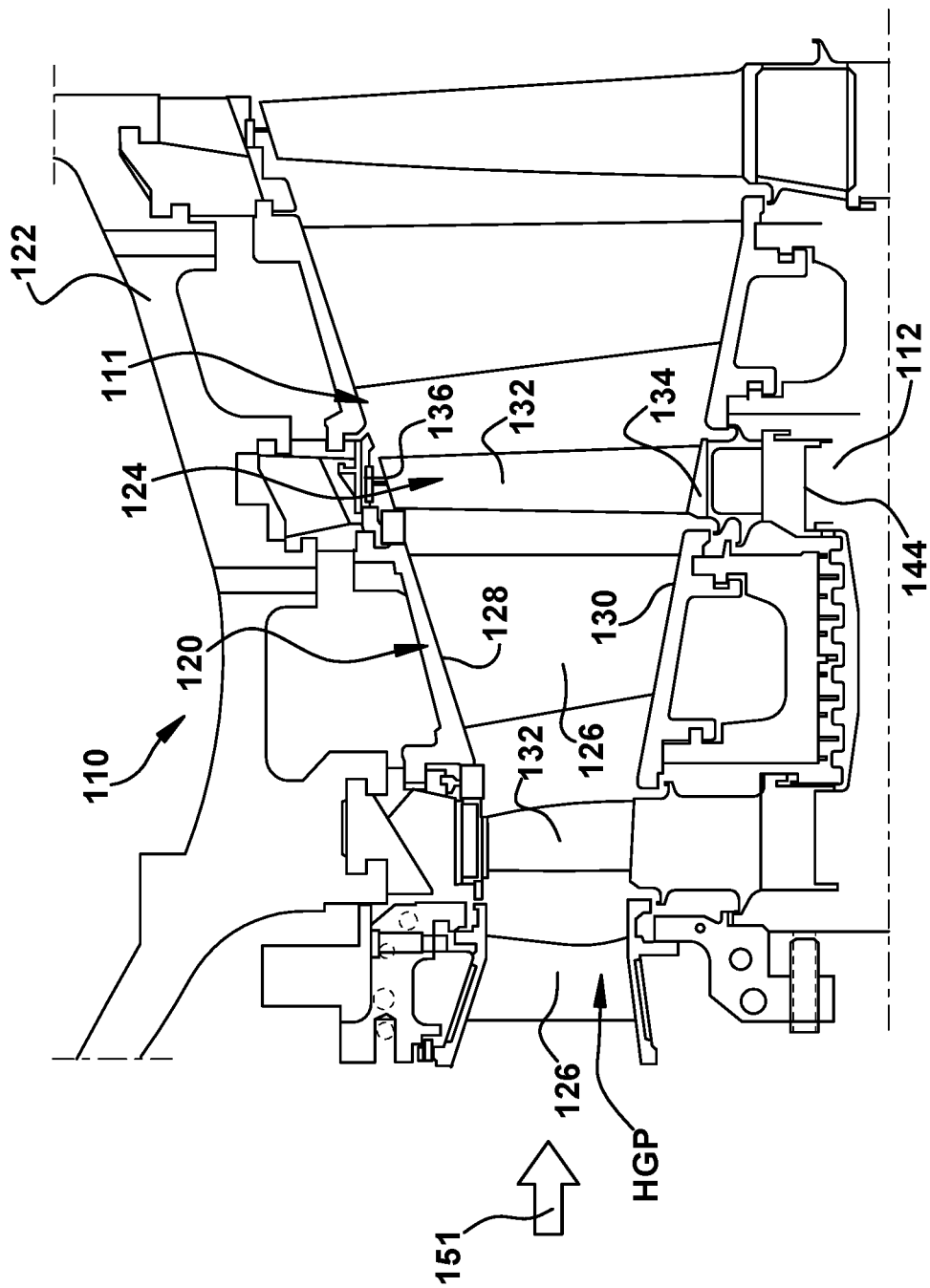
FIG. 2 shows a cross-sectional view of an illustrative gas turbine assembly that may be used with the gas turbine system in FIG. 1 and including a component according to embodiments of the disclosure.

FIG. 2 shows a cross-sectional view of an illustrative turbine assembly 110 of turbomachine 100 (FIG. 1) that may be used with the gas turbine system in FIG. 1. Turbine 111 of turbine assembly 110 includes a row of nozzle or vanes 120 coupled to a stationary casing 122 of turbomachine 100 and axially adjacent a row 124 of rotating blades 132. A stationary vane or nozzle 126 may be held in turbine assembly 110 by a radially outer platform 128 and a radially inner platform 130. Row 124 of blades in turbine assembly 110 includes rotating blades 132 coupled to rotor 112 and rotating with the rotor. Rotating blades 132 may include a radially inward platform 148 (FIG. 3, at root of blade 132) coupled to rotor 112 and, optionally, a radially outward tip shroud 136 (at tip of blade). As used herein, the term "component" may refer collectively to stationary nozzles 126, rotating blades 132 or any other structure in which metal coupons including porous region(s) according to the disclosure can be employed.

Figure 3:
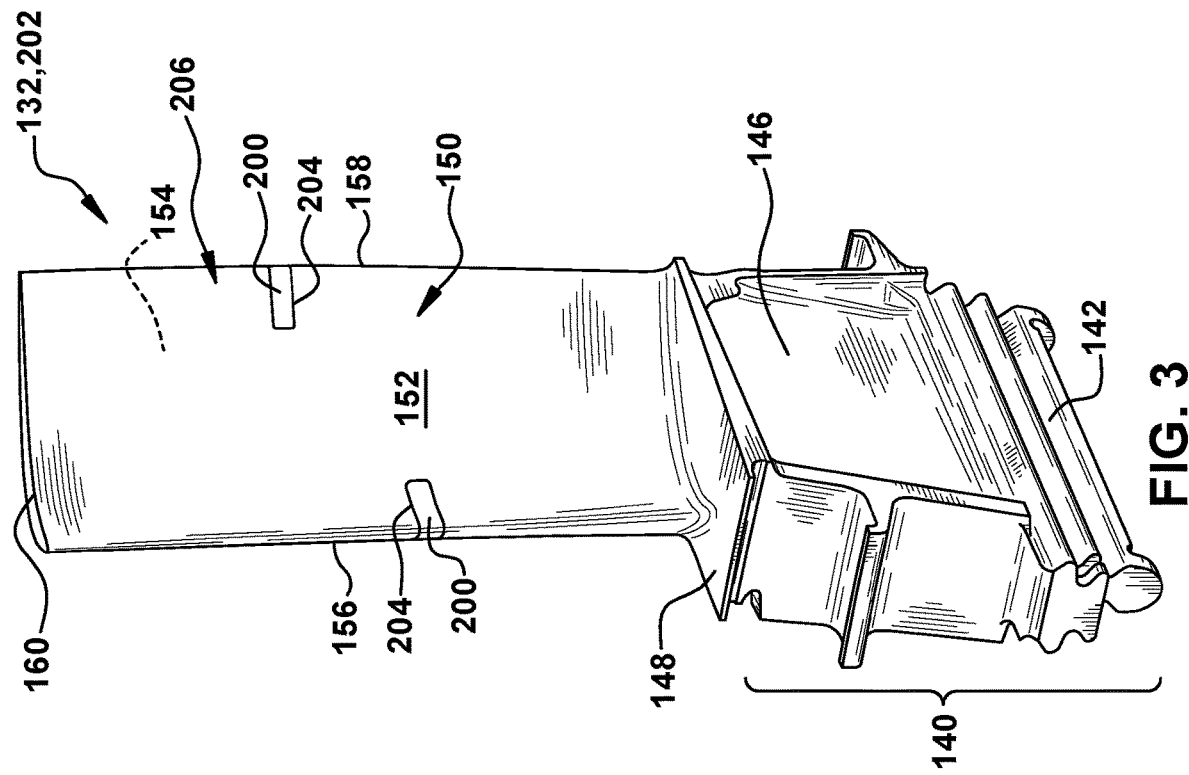
FIG. 3 shows a perspective view of a component in the form of a turbine rotating blade including a metal coupon according to embodiments of the disclosure.
Figure 4:
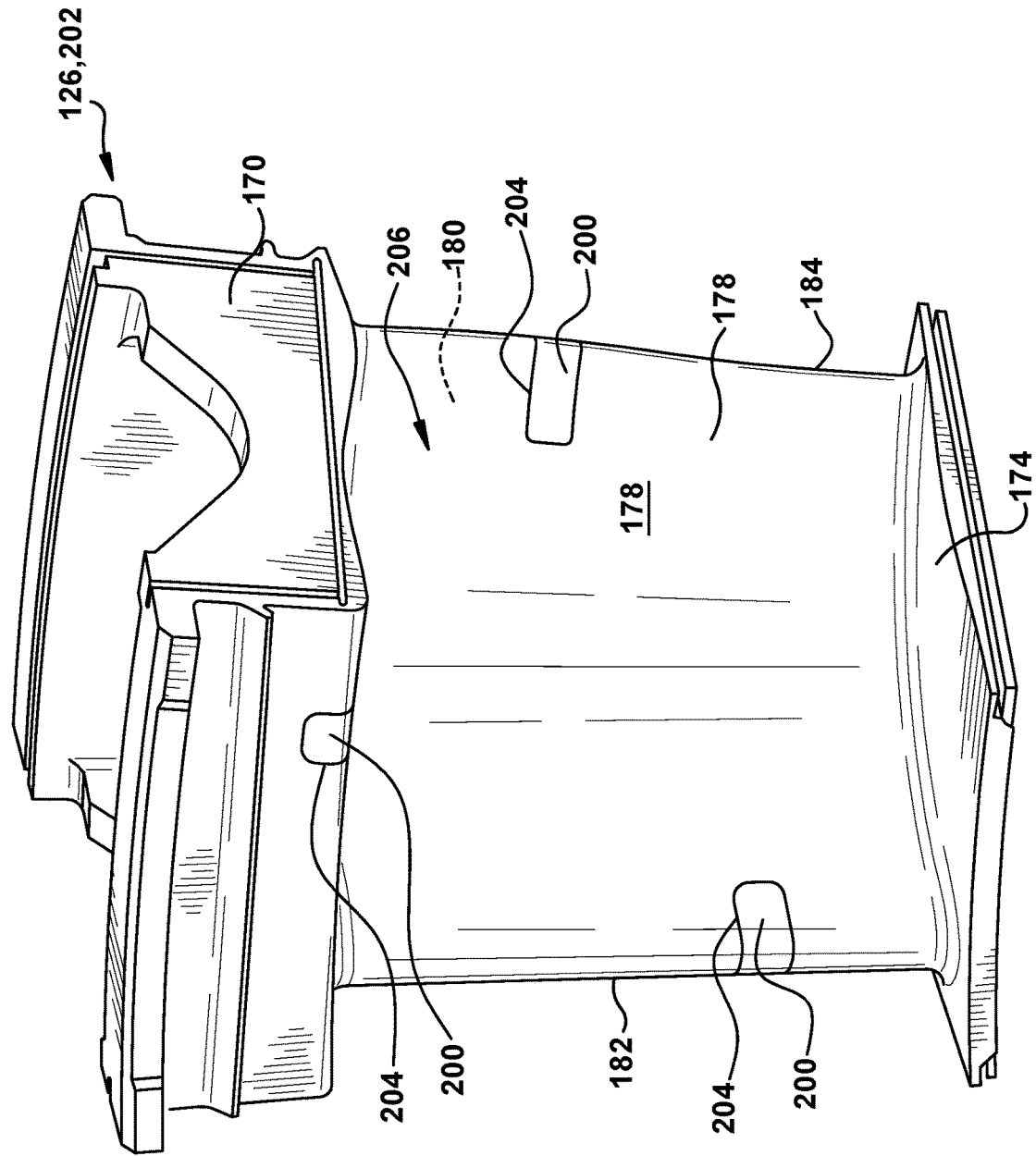
FIG. 4 shows a perspective view of a component in the form of a turbine nozzle including a metal coupon according to embodiments of the disclosure.

FIGS. 3 and 4 show illustrative components, such as hot gas path components of a turbomachine, in which teachings of the disclosure may be employed. FIG. 3 shows a perspective view of a turbine rotor blade 132 of the type in which embodiments of the present disclosure may be employed. Turbine rotor blade 132 includes a root 140 by which rotor blade 132 attaches to rotor 112 (FIG. 2). Root 140 may include a dovetail 142 configured for mounting in a corresponding dovetail slot in the perimeter of a rotor wheel 144 (FIG. 2) of rotor 112 (FIG. 2). Root 140 may further include a shank 146 that extends between dovetail 142 and a platform 148, which is disposed at the junction of an airfoil 150 and root 140 and defines a portion of the inboard boundary of the flow path through turbine assembly 110. It will be appreciated that airfoil 150 is the active component of rotor blade 132 that intercepts the flow of working fluid 151 (FIG. 2), i.e., hot combustions gases, and induces the rotor disc to rotate. It will be seen that airfoil 150 of rotor blade 132 includes a concave pressure side (PS) outer wall 152 and a circumferentially or laterally opposite convex suction side (SS) outer wall 154 extending axially between opposite leading and trailing edges 156, 158 respectively. Side outer walls 152 and 154 also extend in the radial direction from platform 148 to an outboard tip 160, the latter of which may or may not include a tip shroud 136 (FIG. 2).

FIG. 4 shows a perspective view of a stationary nozzle 126 of the type in which embodiments of the present disclosure may be employed. Stationary nozzle 126 includes an outer platform 170 by which stationary nozzle 126 attaches to stationary casing 122 (FIG. 2) of the turbomachine. Outer platform 170 may include any now known or later developed mounting configuration for mounting in a corresponding mount in the casing. Stationary nozzle 126 may further include an inner platform 174 for positioning between adjacent turbine rotor blades 132 (FIG. 3) and platforms 148 (FIG. 3). Platforms 170, 174 define respective portions of the outboard and inboard boundary of the flow path through turbine assembly 110. It will be appreciated that airfoil 176 is the active component of stationary nozzle 126 that intercepts the flow of working fluid and directs it towards turbine rotor blades 132 (FIG. 3). It will be seen that airfoil 176 of stationary nozzle 126 includes a concave pressure side (PS) outer wall 178 and a circumferentially or laterally opposite convex suction side (SS) outer wall 180 extending axially between opposite leading and trailing edges 182, 184 respectively. Side outer walls 178 and 180 also extend in the radial direction from platform 170 to platform 174.

It is understood that blade 132 or nozzle 126 may include internal cooling structures including sources of coolant such as passages, conduits and other structure that deliver coolant to a surface thereof for film cooling. Coolant may include, for example, air from compressor 102.

Embodiments of the disclosure described herein may include aspects applicable to either stationary nozzle 126, turbine rotor blade 132, and/or any other industrial component that employs coupons. FIGS. 3 and 4 also show illustrative additively manufactured (AM) metal coupons 200 (hereafter "metal coupons 200" or "AM metal coupons(s) 200" for brevity) in a component 202. More particularly, metal coupons 200 may be in a coupon opening 204 in a body 206 of component 202. A "coupon opening 204 in body 206" may be any size void in body 206 up to and including a removed section of body 206, e.g., tip shroud. For example, metal coupons 200 can be in coupon openings 204 in trailing edges 158, 184 of blade 132 or nozzle 126, respectively. Alternatively, metal coupons 200 can be in coupon openings 204 in leading edges 156, 182 of blade 132 or nozzle 126, respectively. Metal coupons 200 could also be in any tip (not shown) of blade 132 or platform 170 (shown in FIG. 4), 174 of nozzle 126. It is emphasized, however, that metal coupons 200 can be employed in any coupon opening 204 in a body 206 of component 202. Body 206 can be any part of, or all, of component 202.

Figure 5:
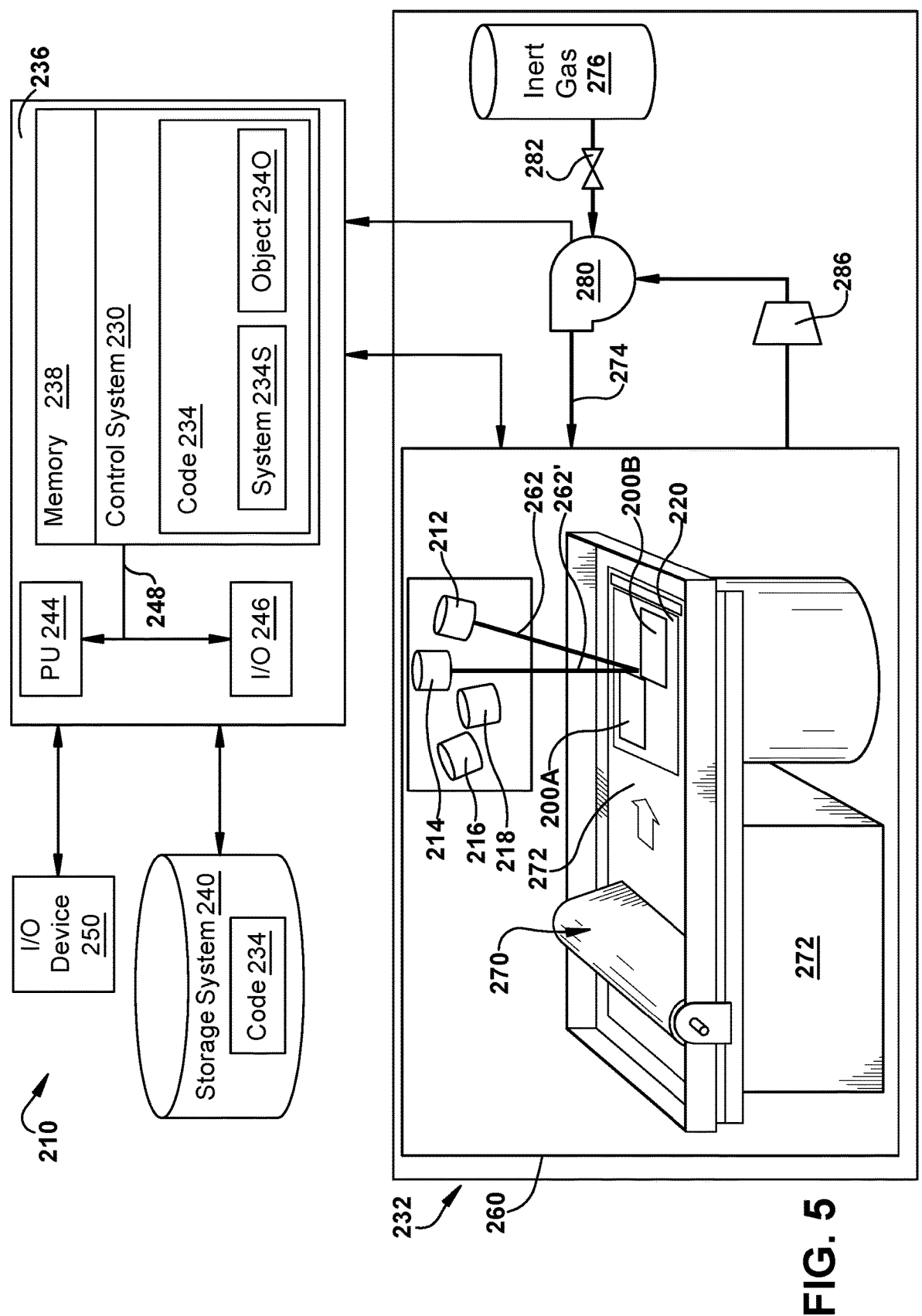
FIG. 5 shows a schematic block diagram of an illustrative additive manufacturing system for additively manufacturing a metal coupon according to embodiments of the disclosure.

Additively manufactured metal coupons 200 that include one or more porous regions and a sealed cavity therein may be made using any now known or later developed technique capable of forming porous region(s). FIG. 5 shows a schematic/block view of an illustrative computerized metal powder additive manufacturing system 210 (hereinafter 'AM system 210') for generating metal coupon 200 or multiple metal coupons 200A, 200B, of which only a single layer is shown. The teachings of the disclosures will be described relative to building metal coupon 200 using multiple melting beam sources 212, 214, 216, 218, but it is emphasized and will be readily recognized that the teachings of the disclosure are equally applicable to build multiple coupons 200A, 200B using any number of melting beam sources. In this example, AM system 210 is arranged for direct metal laser melting (DMLM). It is understood that the general teachings of the disclosure are equally applicable to other forms of metal powder additive manufacturing such as but not limited to powder bed fusion, direct metal laser sintering (DMLS), electron beam melting (EBM), selective laser sintering (SLS), selective laser melting (SLM), and perhaps other forms of additive manufacturing (i.e., other than metal powder applications). Coupons 200A, 200B are illustrated as rectangular elements; however, it is understood that the additive manufacturing process can be readily adapted to manufacture any shaped coupon, a large variety of different coupons, and a large number of coupons on build platform 220.

AM system 210 generally includes an additive manufacturing control system 230 ("control system") and an AM printer 232. As will be described, control system 230 executes set of computer-executable instructions or code 234 to generate coupon(s) 200 using multiple melting beam sources 212, 214, 216, 218. In the example shown, four melting beam sources may include four lasers. However, the teachings of the disclosures are applicable to any melting beam source, e.g., an electron beam, laser, etc. Control system 230 is shown implemented on computer 236 as computer program code. To this extent, computer 236 is shown including a memory 238 and/or storage system 240, a processor unit (PU) 244, an input/output (I/O) interface 246, and a bus 248. Further, computer 236 is shown in communication with an external I/O device/resource 250. In general, processor unit (PU) 244 executes computer program code 234 that is stored in memory 238 and/or storage system 240. While executing computer program code 234, processor unit (PU) 244 can read and/or write data to/from memory 238, storage system 240, I/O device 250 and/or AM printer 232. Bus 248 provides a communication link between each of the components in computer 236, and I/O device 250 can comprise any device that enables a user to interact with computer 236 (e.g., keyboard, pointing device, display, etc.). Computer 236 is only representative of various possible combinations of hardware and software. For example, processor unit (PU) 244 may comprise a single processing unit or be distributed across one or more processing units in one or more locations, e.g., on a client and server. Similarly, memory 238 and/or storage system 240 may reside at one or more physical locations. Memory 238 and/or storage system 240 can comprise any combination of various types of non-transitory computer readable storage medium including magnetic media, optical media, random access memory (RAM), read only memory (ROM), etc. Computer 236 can comprise any type of computing device such as an industrial controller, a network server, a desktop computer, a laptop, a handheld device, etc.

As noted, AM system 210 and, in particular control system 230, executes code 234 to generate metal coupon(s) 200. Code 234 can include, among other things, a set of computer-executable instructions 234S (herein also referred to as 'code 234S') for operating AM printer 232, and a set of computer-executable instructions 234O (herein also referred to as 'code 234O') defining metal coupon(s) 200 to be physically generated by AM printer 232. As described herein, additive manufacturing processes begin with a non-transitory computer readable storage medium (e.g., memory 238, storage system 240, etc.) storing code 234. Set of computer-executable instructions 234S for operating AM printer 232 may include any now known or later developed software code capable of operating AM printer 232.

Set of computer-executable instructions 234O defining metal coupon(s) 200 may include a precisely defined 3D model of a coupon and can be generated from any of a large variety of well-known computer aided design (CAD) software systems such as AutoCAD®, TurboCAD®, DesignCAD 3D Max, etc. In this regard, code 234O can include any now known or later developed file format. Furthermore, code 234O representative of metal coupon(s) 200 may be translated between different formats. For example, code 234O may include Standard Tessellation Language (STL) files which was created for stereolithography CAD programs of 3D Systems, or an additive manufacturing file (AMF), which is an American Society of Mechanical Engineers (ASME) standard that is an extensible markup-language (XML) based format designed to allow any CAD software to describe the shape and composition of any three-dimensional object to be fabricated on any AM printer. Code 234O representative of metal coupon(s) 200 may also be converted into a set of data signals and transmitted, received as a set of data signals and converted to code, stored, etc., as necessary. Code 234O may be configured according to embodiments of the disclosure to allow for formation of border and internal sections in overlapping field regions, as will be described. In any event, code 234O may be an input to AM system 210 and may come from a part designer, an intellectual property (IP) provider, a design company, the operator or owner of AM system 210, or from other sources. In any event, control system 230 executes code 234S and 234O, dividing metal coupon(s) 200 into a series of thin slices that assembles using AM printer 232 in successive layers of material.

AM printer 232 may include a processing chamber 260 that is sealed to provide a controlled atmosphere for metal coupon(s) 200 printing. A build platform 220, upon which metal coupon(s) 200 is/are built, is positioned within processing chamber 260. A number of melting beam sources 212, 214, 216, 218 are configured to melt layers of metal powder on build platform 220 to generate coupon(s) 200. While four melting beam sources 212, 214, 216, 218 are illustrated, it is emphasized that the teachings of the disclosure are applicable to a system employing any number of sources, e.g., 1, 2, 3, or 5 or more. As understood in the field, each melting beam source 212, 214, 216, 218 may have a field including a non-overlapping field region, respectively, in which it can exclusively melt metal powder, and may include at least one overlapping field region in which two or more sources can melt metal powder. In this regard, each melting beam source 212, 214, 216, 218 may generate a melting beam, respectively, that fuses particles for each slice, as defined by code 234O. For example, in FIG. 5, melting beam source 212 is shown creating a layer of metal coupon(s) 200 using melting beam 262 in one region, while melting beam source 214 is shown creating a layer of metal coupon(s) 200 using melting beam 262' in another region. Each melting beam source 212, 214, 216, 218 is calibrated in any now known or later developed manner. That is, each melting beam source 212, 214, 216, 218 has had its laser or electron beam's anticipated position relative to build platform 220 correlated with its actual position in order to provide an individual position correction (not shown) to ensure its individual accuracy. In one embodiment, each of plurality melting beam sources 212, 214, 216, 218 may create melting beams, e.g., 262, 262', having the same cross-sectional dimensions (e.g., shape and size in operation), power and scan speed.

Continuing with FIG. 5, an applicator (re-coater blade) 270 may create a thin layer of raw material 272 spread out as the blank canvas from which each successive slice of the final coupon will be created. Various parts of AM printer 232 may move to accommodate the addition of each new layer, e.g., a build platform 220 may lower and/or chamber 260 and/or applicator 270 may rise after each layer. The process may use different raw materials in the form of fine-grain metal powder, a stock of which may be held in a chamber 260 accessible by applicator 270. In the instant case, coupon(s) 200 may be made of a metal which may include a pure metal or an alloy. In one example, the metal may include practically any non-reactive metal powder, i.e., non-explosive or non-conductive powder, such as but not limited to: a cobalt chromium molybdenum (CoCrMo) alloy, stainless steel, an austenite nickel-chromium based alloy such as a nickel-chromium-molybdenum-niobium alloy (NiCrMoNb) (e.g., Inconel 625 or Inconel 718), a nickel-chromium-iron-molybdenum alloy (NiCrFeMo) (e.g., Hastelloy® X available from Haynes International, Inc.), or a nickel-chromium-cobalt-molybdenum alloy (NiCrCoMo) (e.g., Haynes 282 available from Haynes International, Inc.). Other possibilities include, for example, René 108, CM 247 LC, Mar M 247 and any precipitation harden-able (PH) nickel alloy.

Processing chamber 260 is filled with an inert gas such as argon or nitrogen and controlled to minimize or eliminate oxygen. Control system 230 is configured to control a flow of a gas mixture 274 within processing chamber 260 from a source of inert gas 276. In this case, control system 230 may control a pump 280, and/or a flow valve system 282 for inert gas to control the content of gas mixture 274. Flow valve system 282 may include one or more computer controllable valves, flow sensors, temperature sensors, pressure sensors, etc., capable of precisely controlling flow of the particular gas. Pump 280 may be provided with or without valve system 282. Where pump 280 is omitted, inert gas may simply enter a conduit or manifold prior to introduction to processing chamber 260. Source of inert gas 276 may take the form of any conventional source for the material contained therein, e.g., a tank, reservoir or other source. Any sensors (not shown) required to measure gas mixture 274 may be provided. Gas mixture 274 may be filtered using a filter 286 in a conventional manner.

In operation, build platform 220 with metal powder thereon is provided within processing chamber 260, and control system 230 controls flow of gas mixture 274 within processing chamber 260 from source of inert gas 276. Control system 230 also controls AM printer 232, and in particular, applicator 270 and melting beam sources 212, 214, 216, 218 to sequentially melt layers of metal powder on build platform 220 to generate metal coupon(s) 200 according to embodiments of the disclosure.

While a particular AM system 210 has been described herein, it is emphasized that the teachings of the disclosure are not limited to any particular additive manufacturing system or method. Also, while the teachings of the disclosure relate to an additively manufactured metal coupon(s) 200, it will be recognized that component 202 may be manufactured in any now known or later developed manner such as additive manufacturing (perhaps similar to that described for metal coupon(s) 200), casting, or other methodology. Component 202 may include any of the material(s) listed herein for metal coupon(s) 200.

Metal coupon 200 includes a sealed cavity 296 in an interior of AM metal member 330 and a porous region 300 around the sealed cavity.

"Porosity," as used herein, is a ratio of open space volume to total volume of the stated structure, e.g., porous regions, metal coupon, etc. Typically, in this regard, porosity is stated as a percentage of volume of open space to overall or total volume of the stated structure. The open space is empty areas in a solid material and may be referred to herein as "pores" 302 and may include interconnecting passages in the material of the stated structure. A "porous region" in metal coupon 200 is thus less than 100% solid and includes open spaces in the form of pores 302 and/or interconnecting passages. Porous metal coupons 200 may include solid regions, but also include one or more porous regions that are less than 100% solid. As used herein, a three-dimensional boundary of a porous region or sub-region for purpose of identifying a "total volume" thereof can be identified by where a change in porosity of greater than 2% relative to an adjacent region or sub-region occurs within metal coupon 200 and/or an edge of metal coupon 200 exists. "Open space volume" is collectively a three-dimensional space that is empty, i.e., a void, gap, empty space and/or not filled with material, within a region or sub-region. As used herein, "different porosities" or "differences in porosity," generally means any variety of characteristics such as: percentage of open space volume to total volume, a number of pores 302 in a given volume, the volume (i.e., size) of pores 302, shape of pores 302, and variations in connecting passages between pores 302 that may not be recognized as actual discrete pores (referred to herein as "pore connecting passages"). As one non-limiting example only, pore size can be in a range of, for example, $1.07 \times 10^{-6}$ to $8.58 \times 10^{-3}$ cubic millimeters ($6.54 \times 10^{-11}$ to $5.24 \times 10^{-7}$ cubic inches), or as another non-limiting example, the pore diameter can be in a range of 0.0127 mm to 0.254 mm (0.0005 inches to 0.01 inches). In the drawings, the different porous regions or sub-regions are typically shown as being continuous or in contact with one another, it is emphasized however that they can be isolated from one another in any manner, e.g., with solid areas therebetween. That is, a single metal coupon may include one or more isolated, non-contacting porous regions or sub-regions. Note, the terms "region" and/or "sub-region" may be used interchangeably to denote changes in porosity.

With differences in, for example, pore shape or pore connecting passages, it will be recognized that differences in porosity may not be exclusively based on percentage of open space volume to total volume. However, where differences in porosities are compared in terms of degree, e.g., higher or lower, the difference referenced is exclusively that of the volume characteristics, i.e., percentage of open space volume to total volume.

Porous metal coupon(s) 200 can be formed with different porous regions with different porosities (which may or may not include one or more porous sub-regions with different porosities) using AM system 210 as described herein, or any other metal additive manufacturing system or method capable of forming porous metals. In terms of AM system 210 operation, melting beam sources 212, 214, 216, 218 can be programmed to intermittently not sinter metal, leaving metal powder rather than solid material. This process may include overlapping laser field regions by different amounts and/or designing pores 302 into a build file, i.e., code 234O. Less overlap of each laser scan creates more porosity, and more laser overlap between successive scans creates less porosity. Laser spot size, scanning speed, focus and power can also be controlled to adjust porosity. More particularly, the additively manufacturing includes using AM system 210 having one or more melting beam sources 212, 214, 216, 218 to fuse together the layers of the metal powder and adjusting a parameter of the system to control the porosity of the at least two porous regions. The adjusting a parameter may include at least one of: adjusting an amount of overlap of a melting area of the one or more melting beam 262, 262' (FIG. 5) (from sources 212, 214, 216, 218); adjusting system scanning speed; and adjusting at least one of melting beam spot size, focus, or power. When the un-melted metal powder is removed from metal coupon(s) 200, it leaves pores 302 with interconnecting passages between pores 302 and creating one or more porous region(s) in metal coupon 200. In any event, the layered manufacture of metal coupon 200 can be controlled to create the desired porosity for any number, shape and/or size of porous regions within any desired layers of metal coupon(s) 200.

Figure 6A:
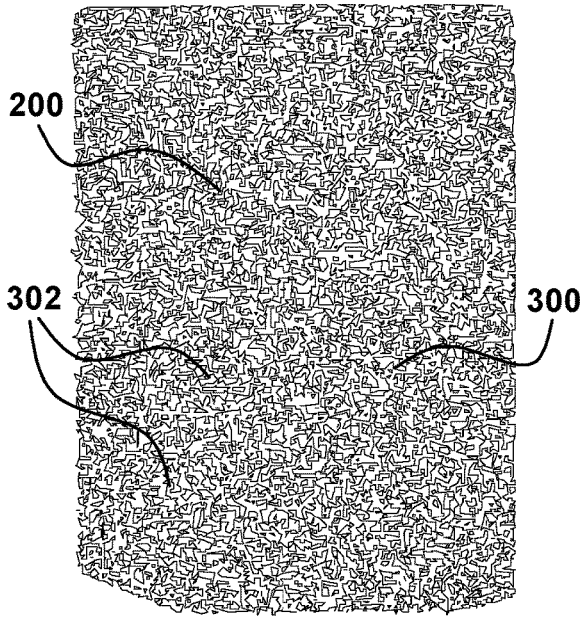
FIGS. 6A-D show top-down views of sample metal coupons having porous regions having different porosities according to embodiments of the disclosure.
Figure 6B:
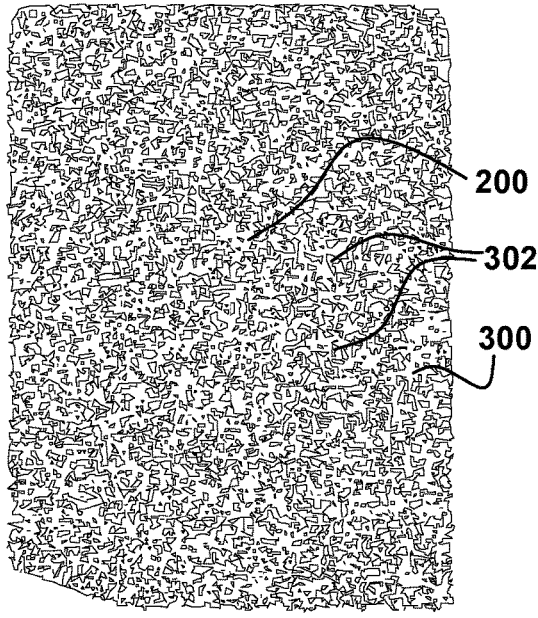
Figure 6C:
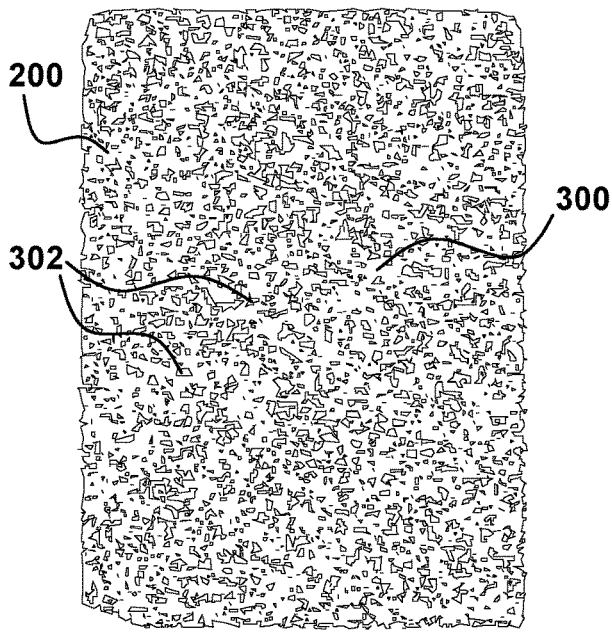
Figure 6D:
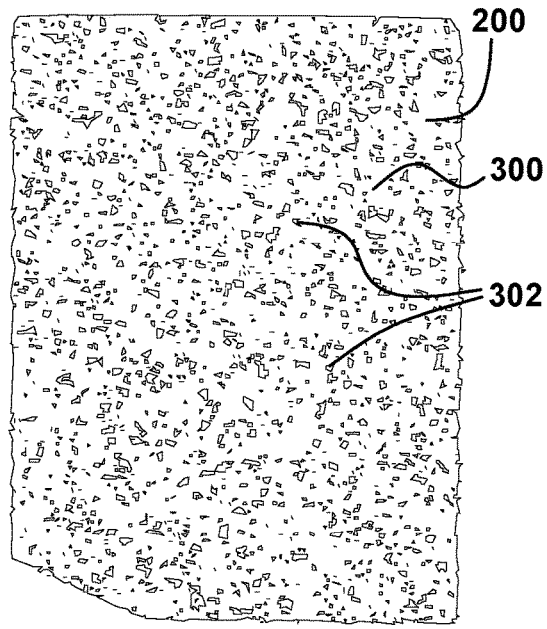

FIGS. 6A-D show top-down schematic views of sample metal coupons 200 having different porosities. Pores 302 are shown as darker open spaces in the drawings. FIG. 6A shows a sample metal coupon 200 having a first porosity of approximately 40% open space volume to total volume of the sample (with a generally high amount of open space and more and/or larger pores 302), FIG. 6B shows a sample metal coupon 200 having a first porosity of approximately 30% open space volume to total volume of sample, FIG. 6C shows a sample metal coupon 200 having a first porosity of approximately 20% open space volume to total volume of the sample, FIG. 6D shows a sample metal coupon 200 having a first porosity of approximately 10% open space volume to total volume of the sample (with a generally low amount of open space). Each porous region may have a porosity between 2% to 50% open space volume to total volume of the porous region, i.e., 2% to 50% open space with the other 50% to 98% solid. In other embodiments, each porosity may be between 10% to 40% open space volume to total volume of porous region 300, i.e., 10% to 40% open space with the other 60% to 90% solid. In other embodiments, porous region(s) can be provided in metal coupons 200 having a porosity in a range of less than 10%, in a range of less than 15%, in a range of less than 20%, in a range of less than 25%, in a range of less than 30%, in a range of less than 35%, in a range of less than 40%, in a range of less than 45%, in a range of 2% to 45%, in a range of 2% to 40%, in a range of 2% to 35%, in a range of 2% to 30%, in a range of 2% to 25%, in a range of 2% to 20%, in a range of 5% to 45%, in a range of 5% to 40%, in a range of 5% to 35%, in a range of 5% to 30%, in a range of 5% to 25%, in a range of 5% to 20%, in a range of 10% to 45%, in a range of 10% to 40%, in a range of 10% to 35%, in a range of 10% to 30%, in a range of 10% to 25%, in a range of 10% to 20%, in a range of 15% to 45%, in a range of 15% to 40%, in a range of 15% to 35%, in a range of 15% to 30%, in a range of 15% to 25%, in a range of 15% to 20%, in a range of 10% to 50%, in a range of 20% to 50%, in a range of 25% to 50%, in a range of 30% to 50%, in a range of 35% to 50%, or in a range of 40% to 50%. As will be described herein, other ranges of porosity are also possible.

Figure 7A:
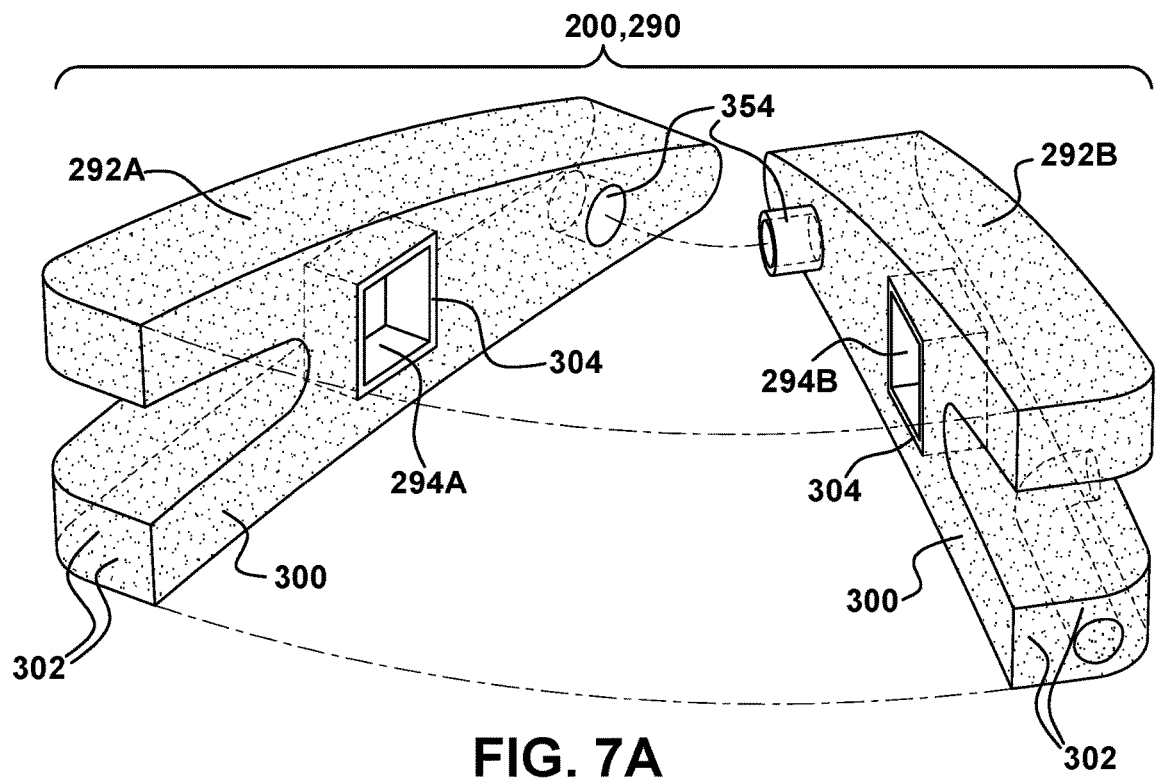
FIGS. 7A-N show perspective or cross-sectional views of a metal coupon according to various embodiments of the disclosure.
Figure 7B:
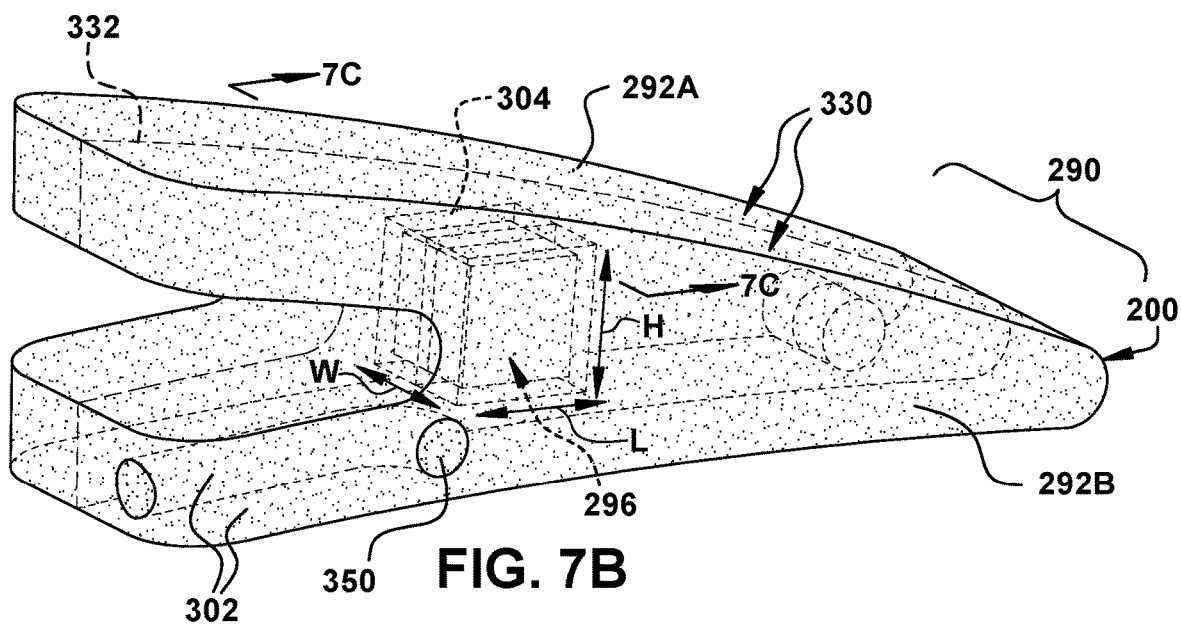
Figure 7C:
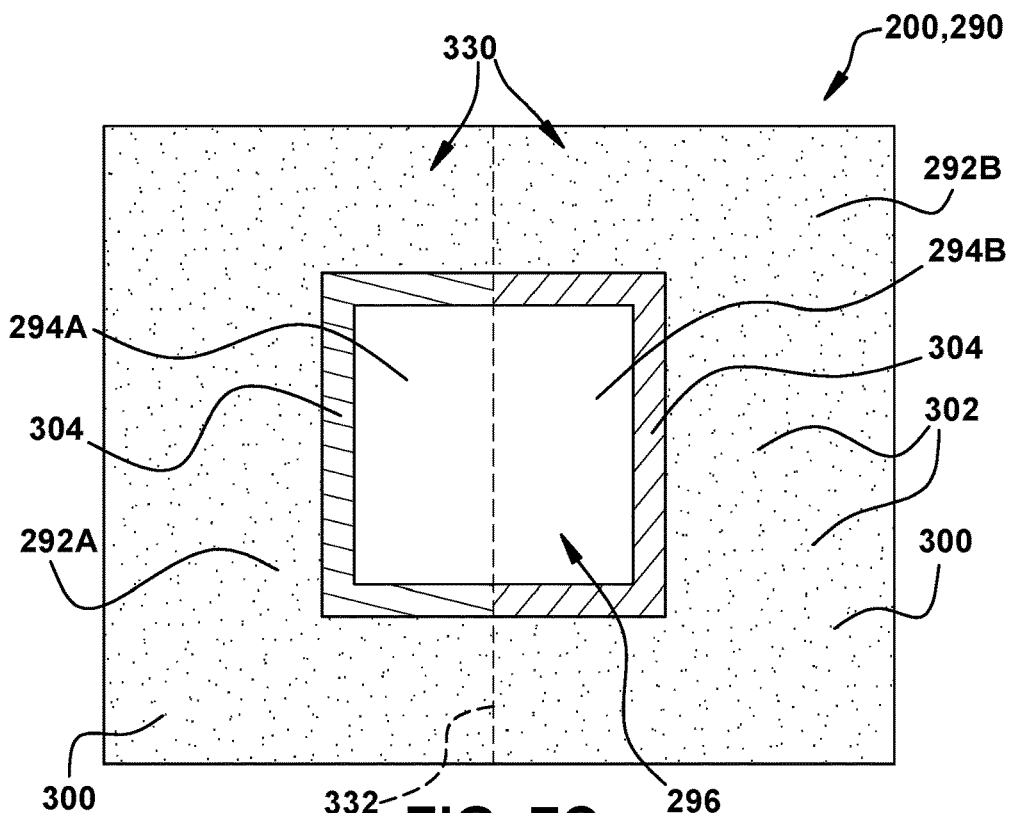
Figure 7D:
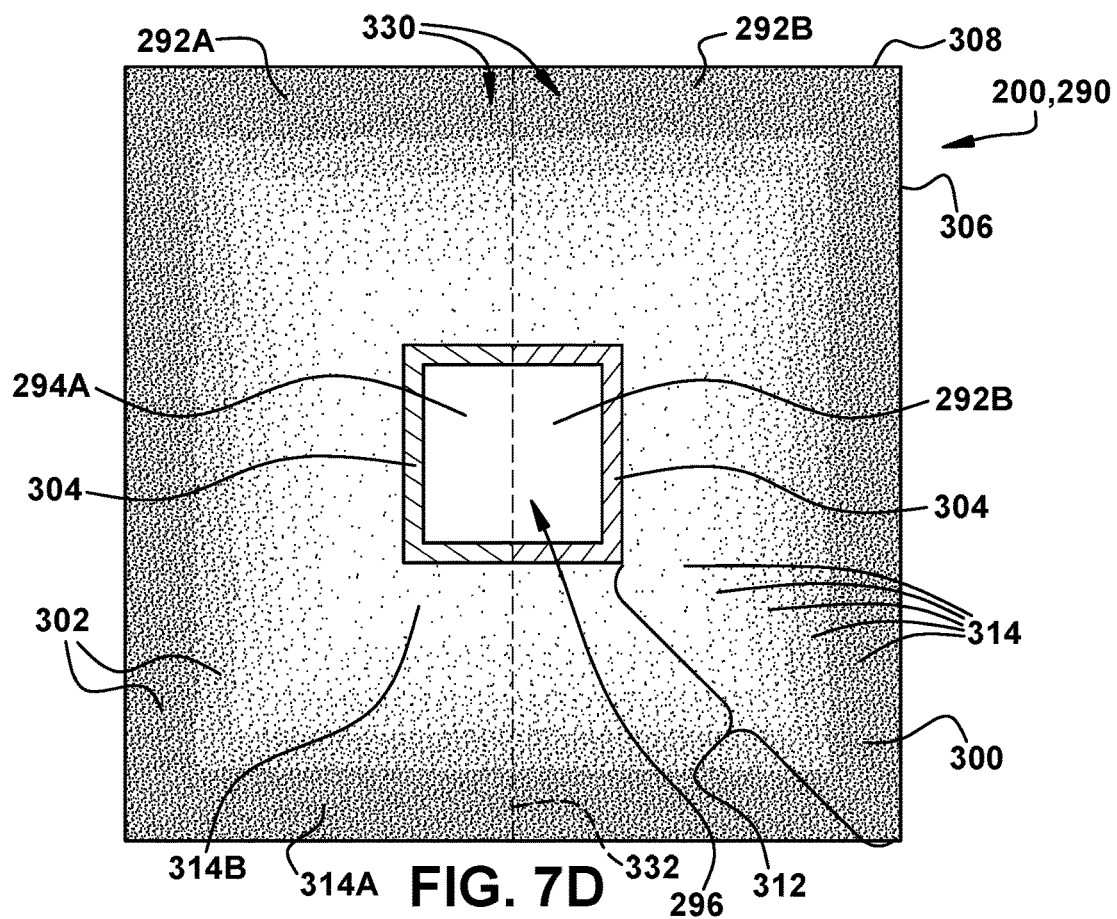
Figure 7E:
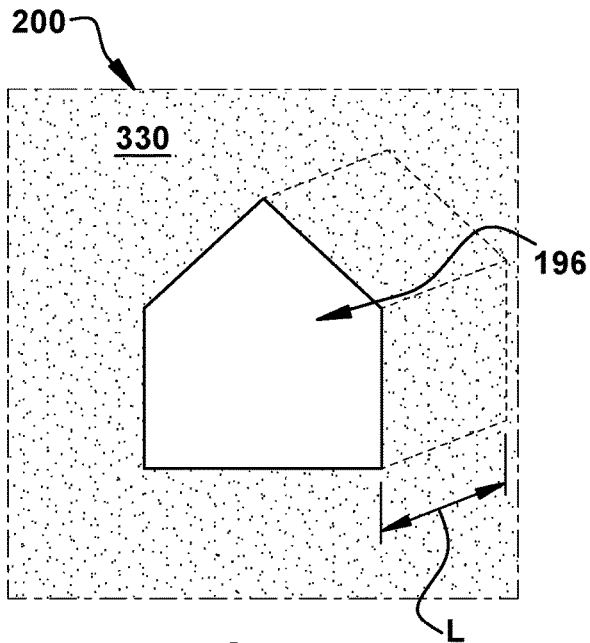
Figure 7F:
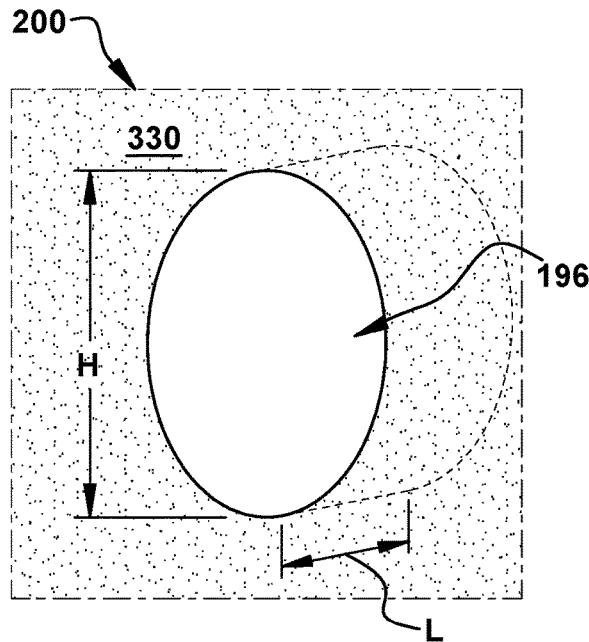
Figure 7G:
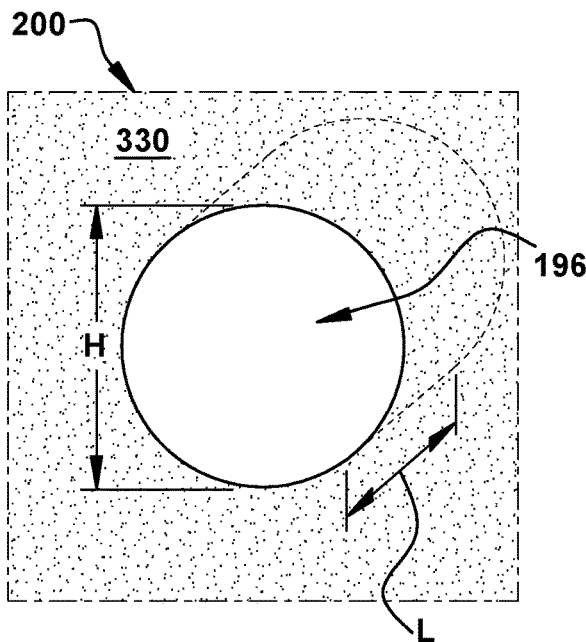
Figure 7H:
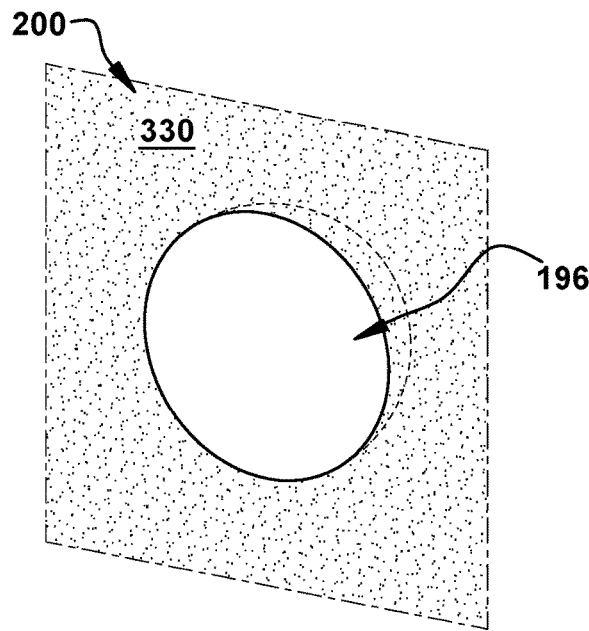
Figure 7I:
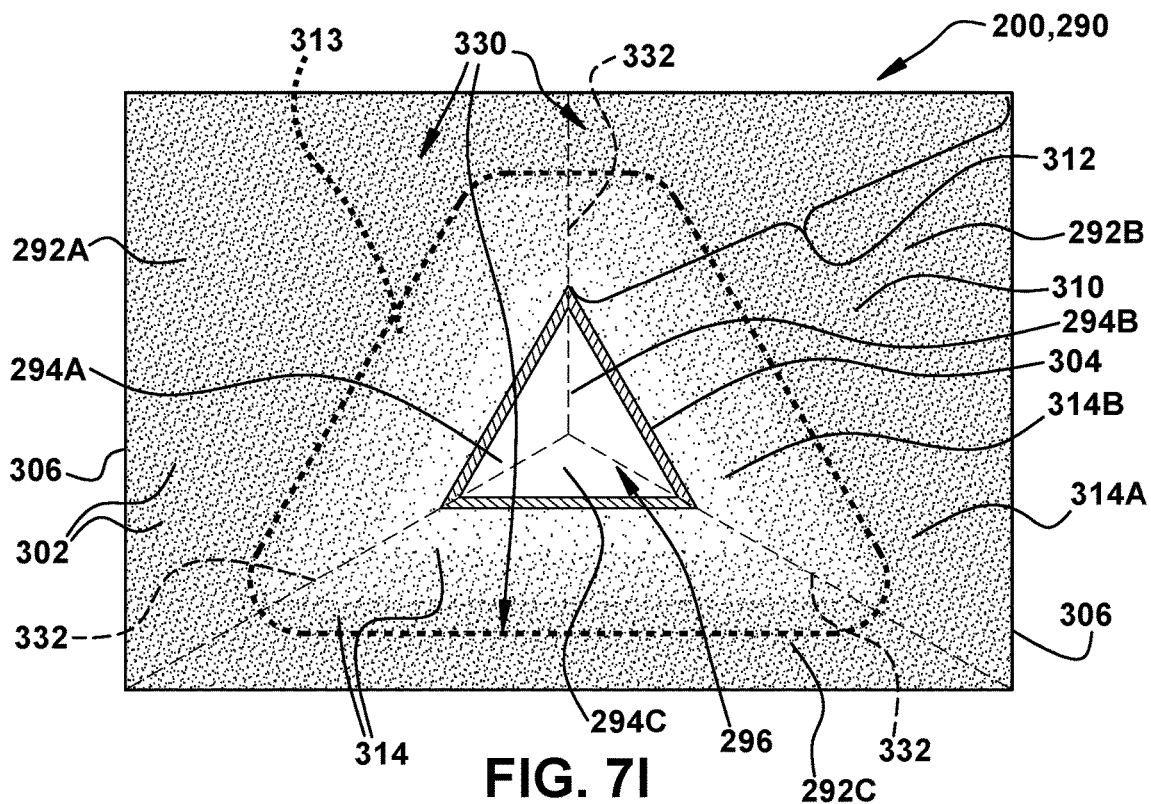
Figure 7J:
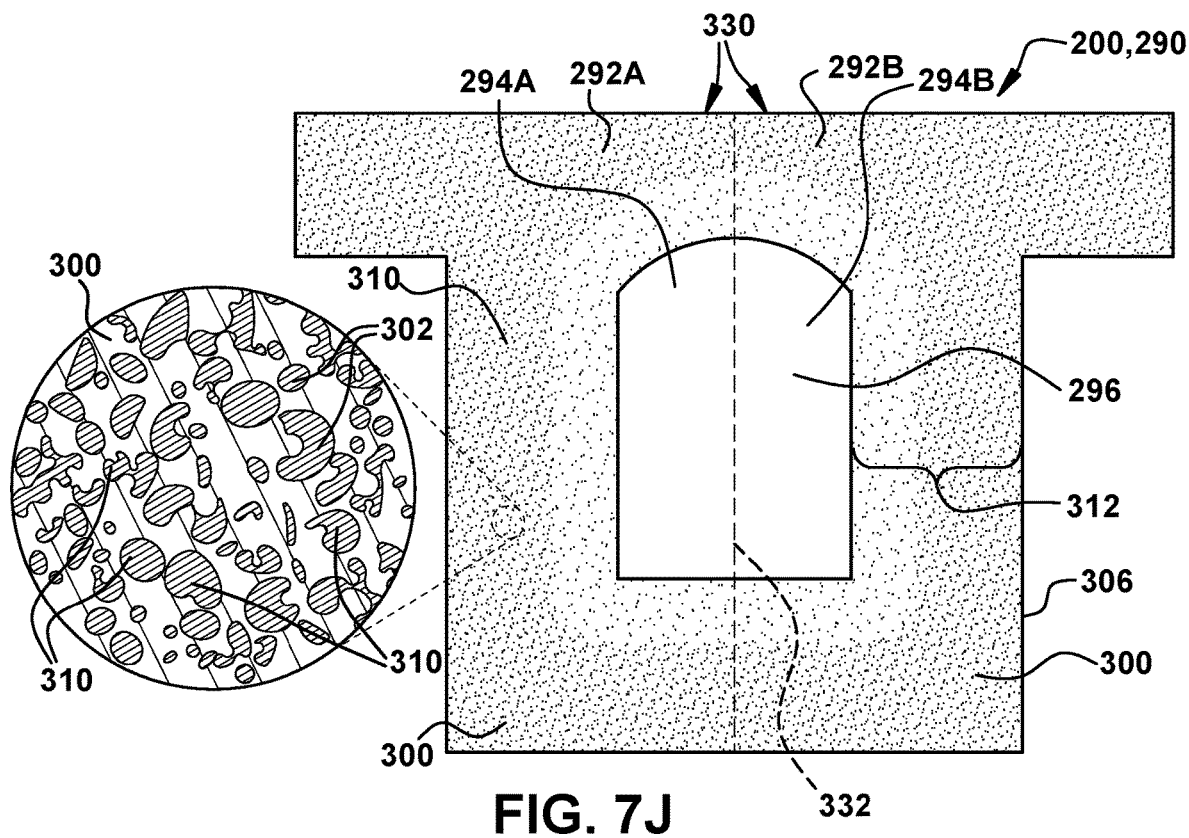
Figure 7K:
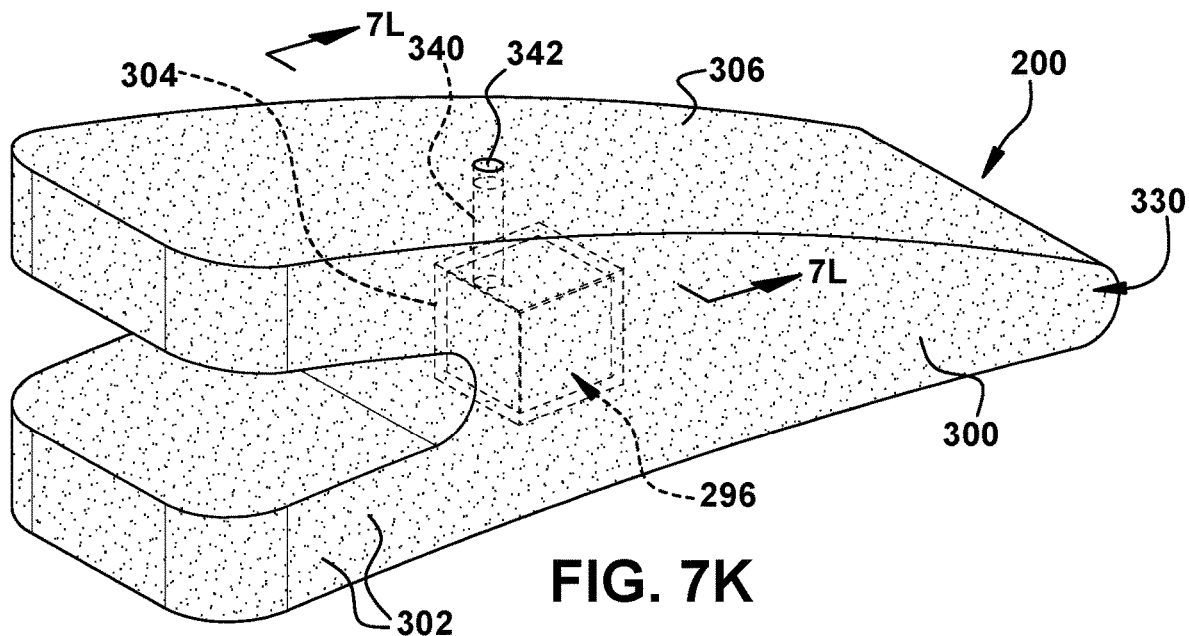
Figure 7L:
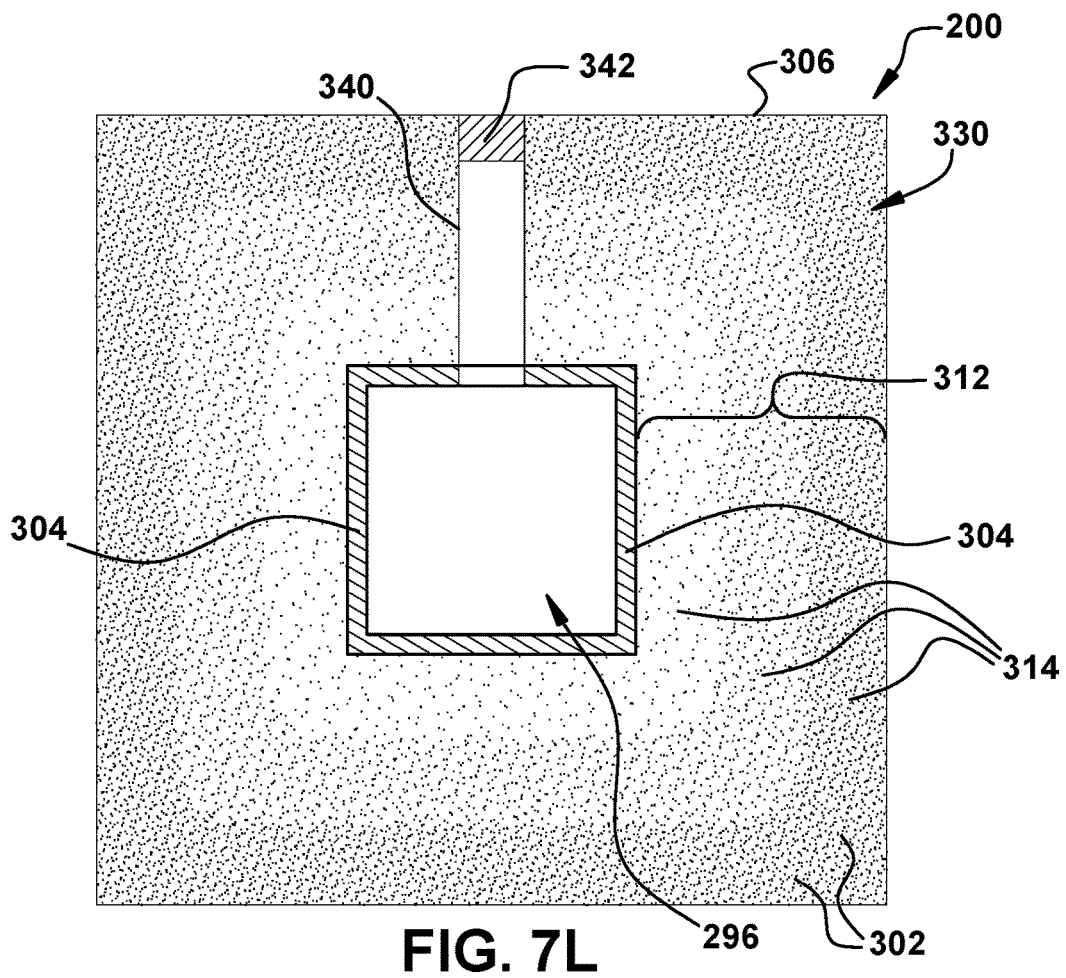
Figure 7M:
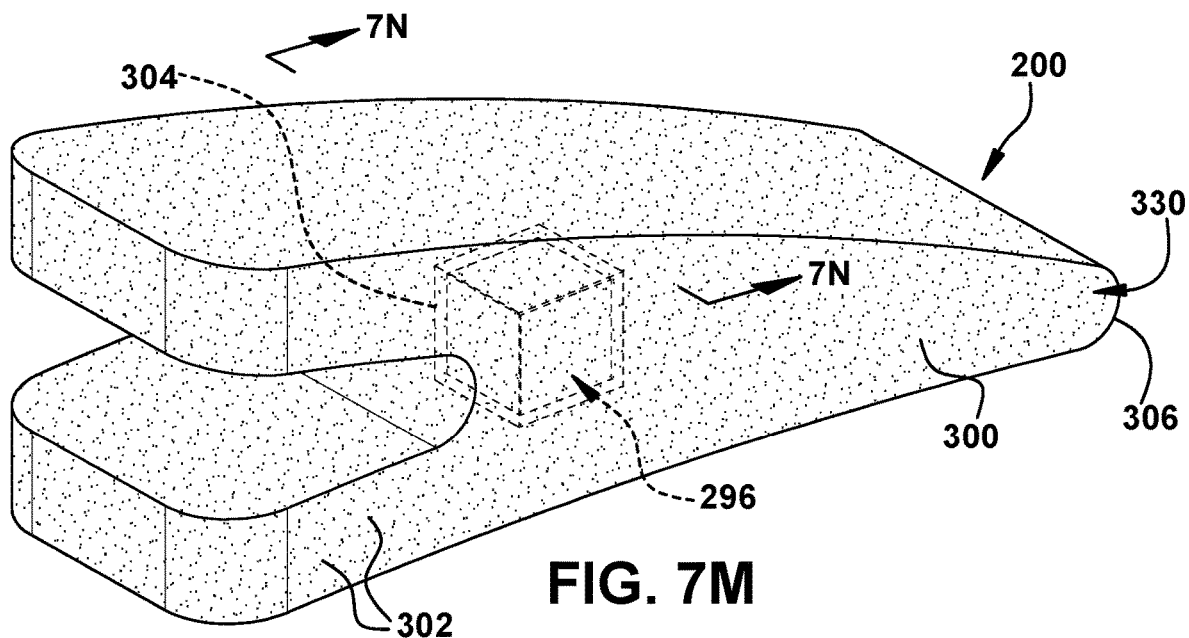
Figure 7N:
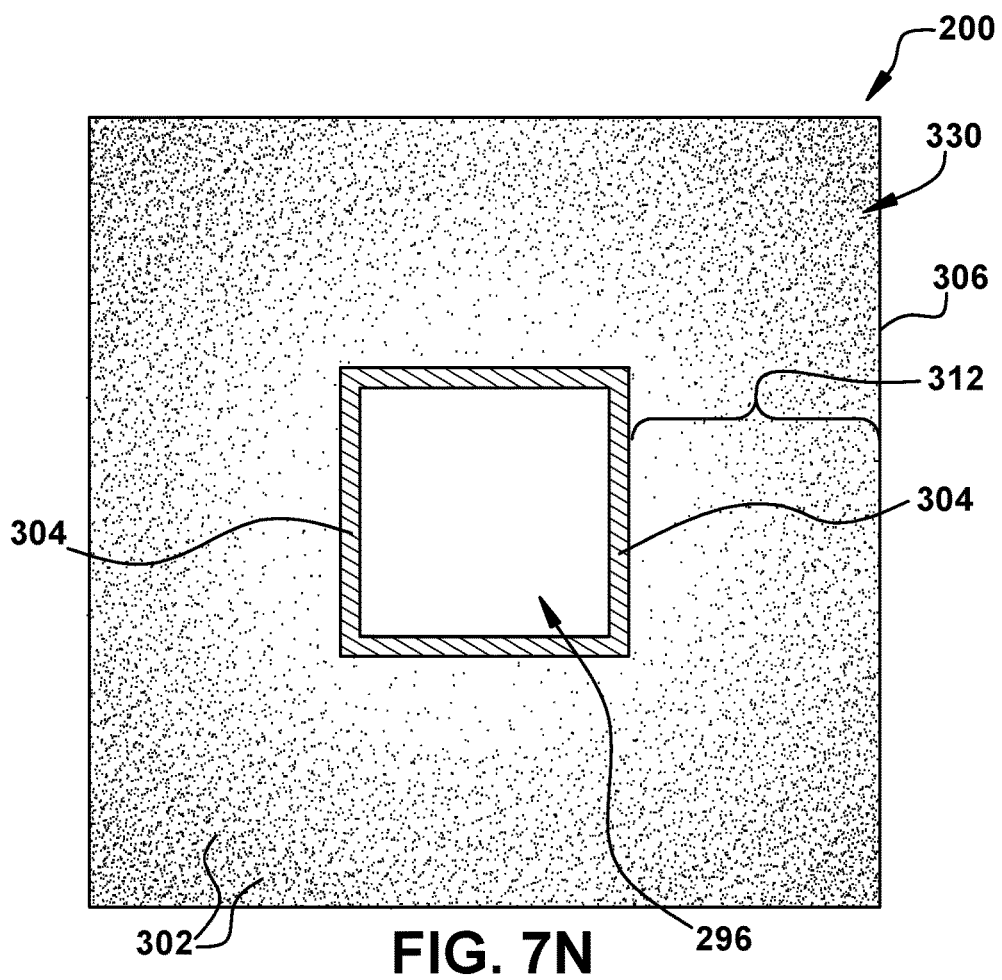

FIGS. 7A-N show views of an illustrative metal coupon 200, according to embodiments of the disclosure. Metal coupon 200 includes an additively manufactured (AM) metal member 330 (FIGS. 7B-D, 7I-N) having a sealed cavity 296 in an interior of AM metal member 330 and porous region 300 around sealed cavity 296. Sealed cavity 296 is hollow. That is, sealed cavity 296 is open space or sufficiently open space inside AM metal member 330 that it includes no discernable pores 302 therein. Sealed cavity 296 can have any surface profile on an inner surface thereof, e.g., it may have ribbed features (not shown) to increase heat transfer. Metal coupon 200 can be additively manufactured in a number of formats. As will be described relative to FIGS. 7A-J, metal coupon 200 can be additively manufactured using a metal coupon system 290 using at least two AM metal parts 292 that collectively form AM metal member 330. Alternatively, as will be described relative to FIGS. 7K-N, metal coupon 200 and AM metal member 330 thereof can be additively manufactured as a single piece.

With regard to metal coupon system 290, FIG. 7A shows a perspective view of metal parts 292 (hereafter "parts") of metal coupon system 290, FIG. 7B shows parts 292 of metal coupon system 290 connected to form AM metal member 330 of metal coupon 200, and FIG. 7C shows a cross-sectional view along view line 7C-7C in FIG. 7B. As shown in FIGS. 7A-C, metal coupon system 290 includes at least two additively manufactured (AM) metal parts 292A, 292B with each AM metal part 292A-B including at least a sealed cavity section 294A-B of an (eventually) sealed cavity 296 (FIGS. 7B-C) therein. Each part 292 also includes a porous region 300 around the at least section 294 of sealed cavity 296.

Sealed cavity 296 may be collectively defined by parts 292 with sealed cavity sections 294 in any manner. In the example shown, metal coupon system 290 includes two parts 292A, 292B that each include (roughly) half sections 294A, 294B of sealed cavity 296. However, any number of parts 292 can be used—each with any percentage of sealed cavity 296 therein that allows parts 292 to, collectively, form sealed cavity 296 when joined together. FIG. 7I shows another example including three parts 292A-C including respective sealed cavity sections 294A-C. As shown, for example, in FIGS. 7B-C and 7I, parts 292 are configured to combine to form metal coupon 200, i.e., AM metal member 330 thereof, with sealed cavity 296 in an interior thereof and porous region 300 around sealed cavity 296. Where two parts 292A-B are used, AM metal member 330 thus includes first metal part 292A including first section 294A of sealed cavity 296 defined therein and second metal part 292B including second section 294B of sealed cavity 296 defined therein. Parts 292 may include any structure desired to ensure they properly align or temporarily stay together prior to brazing, e.g., adhesive, mating connectors 354 (FIG. 7A), clamps, etc. As will be described further, first and second metal parts 292A-B will be coupled using braze material 310 that infiltrates porous region 300.

Sealed cavity 296 may be defined in AM metal member 330 in a number of ways. In certain embodiments, sealed cavity 296 is defined within a braze material infiltration barrier 304. Braze material infiltration barrier 304 (hereinafter "barrier 304") may include a layer of (lower) porosity material, e.g., melted metal powder, through which a braze material 310 (FIGS. 8E-G, 9A-D) to be used to couple metal coupon 200 in coupon opening 204 of body 206 of component 202 will not infiltrate. Hence, barrier 304 has a porosity low enough to act as a braze material flow blocker and an encasement layer about sealed cavity 296. Barrier 304 may be a relatively thin layer, e.g., less than 0.5 millimeters. The porosity of barrier 304 prevents braze material 310 infiltration into sealed cavity 296 and may vary depending on the material of metal coupon 200 and that of braze material 310. That is, barrier 304 may allow some infiltration of braze material 310 but does not allow braze material 310 from passing therethrough into sealed cavity 296. Although not necessary, barrier 304 may be 100% solid, i.e., with 0% open space. Porous region 300 is outside of barrier 304 so that braze material 310 directed to infiltrate porous region 300 will infiltrate until it reaches barrier 304. Barrier 304 defines sealed cavity 296 regardless of its shape, i.e., barrier 304 has at least the same internal shape.

In alternative embodiments, as shown in FIG. 7J, where porous region 300 otherwise limits infiltration of braze material 310 from entering sealed cavity sections 294, barrier 304 may be omitted. For example, barrier 304 may not be required where a flow path that is too long for braze material 310 to reach sealed cavity sections 294A-B can be provided. This arrangement requires controlling the brazing process, e.g., the amount of braze material supplied, duration, pressure, temperature, etc., to attain the desired, limited braze material 310 infiltration.

In FIGS. 7A-D, sealed cavity 296 is shown having a cubic shape, perhaps with a square or rectangular cross-section. However, sealed cavity 296 can have any shape capable of being formed using additive manufacturing either as a single cavity or in sealed cavity sections 294. FIGS. 7E-7H show perspective views of a non-comprehensive list of options of sealed cavity 296 shapes including, for example: cubic but with a peaked top (FIG. 7E); cross-sectionally oblong (FIG. 7F) in a height H direction; and circular (FIG. 7G) in cross-section but cylindrical overall. Sealed cavity 296 can have any dimensions desired within the confines of AM metal member 330. In FIG. 7B, sealed cavity 296 has generally equal width W, height H and length L, but they could be different. In FIGS. 7E-G, length L is shown in various dimensions (into page). In the FIG. 7H example, sealed cavity 296 is spherical. In the cross-sectional view of FIG. 7I, sealed cavity 296 has a triangular cross-section.

As will be described further herein, and as shown in FIGS. 3, 4, 8C-G, 9A-D, braze material 310 infiltrated into porous region 300 couples parts 292 together and couples metal coupon 200 in coupon opening 204 of body 206 of component 202. Braze material 310 (and barrier 304, where provided) seals sealed cavity 296 once AM metal parts 292 are positioned in coupon opening 204 and coupled therein with braze material 310. For illustration purposes, FIGS. 7B-D and 7I show seams 332 (dashed lines) between AM metal parts 292 that would be filled by braze material 310. Note, seams 332 may not be visually discernible in metal coupon 200 in component 202.

In FIGS. 7B-C, porous region 300 includes a single, uniform porosity outside of barrier 304. FIG. 7D shows a cross-sectional view of metal coupon 200 and metal coupon system 290 similar to that of FIG. 7C. In certain embodiments, as shown in for example FIGS. 7D and 7I-7L, porous region 300 may include a variable porosity region 312. Variable porosity region 312 may include two or more porous sub-regions 314 having different porosities. Variable porosity region 312 surrounds barrier 304, where provided, and sealed cavity 296. As shown in FIGS. 7D, 7I-7L, a porosity of porous region 300 may increase or decrease (or both) from near (e.g., within 0.5 millimeters) or next to sealed cavity 296 towards exterior surface 306 of AM metal member 330. The change in porosity in variable porosity region 312 may be gradual, or stepped (shown with sub-regions 314) or otherwise incremental. For example, FIG. 7J shows an embodiment in which all of porous region 300 includes variable porosity region 312 having a porosity that gradually changes, e.g., increases or decreases, from sealed cavity 296 to exterior surface 306 of metal coupon 200. In terms of stepped change, as shown in FIGS. 7D, 7I and 7L, the porosity of porous region 300 may increase in incremental steps from near sealed cavity 296 towards exterior surface 306 of AM metal member 330—see stepped porous sub-regions 314. In FIG. 7D, five different porosity porous sub-regions 314 are shown; in FIG. 7I, two different porous sub-regions 314 are shown; and in FIG. 7L, three different porous sub-regions 314 are shown. It is emphasized that any number of stepped sub-regions 314 may be used.

The different porosities of variable porosity region 312 and/or sub-regions 314 are different from each other in terms of at least one of the following characteristics: percentage of open space volume to total volume, pore shape, pore size, number of pores, or pore connectivity. Each porous region 300 or porous sub-region 314 may have a porosity as previously described herein. The different porosities allow control of braze material 310 uptake, i.e., through capillary action into metal coupon 200. To illustrate, with regard to FIG. 7I, porous region 300 includes an outer porous sub-region 314A adjacent exterior surface 306 of AM metal member 330 that has a higher porosity than an inner porous sub-region 314B near sealed cavity 296. Hence, outer porous sub-region 314A is configured to accept more braze material 310 therein than inner porous sub-region 314B. Accordingly, braze material 310 uptake will be minimal in or near barrier 304 and increase as one moves away from sealed cavity 296. In an alternative embodiment, shown with dashed lines in FIG. 7I, variable porous region 312 may include an intermediate variable porous sub-region 313 that may have gradually changing porosity (dashed line) between outer and inner porous sub-regions 314A, 314B. As noted, the porosity change may be gradual, stepped or incremental. In any event, outer porous sub-region 314A is configured to accept more braze material 310 therein than inner porous sub-region 314B. Accordingly, braze material 310 uptake will be minimal in or near barrier 304 and increase as one moves away from sealed cavity 296. Variable porosity sub-region 313 may uptake braze material 310 in a level between that of inner porous sub-region 314B and outer porous sub-region 314A.

FIG. 7K shows a perspective view and FIG. 7L shows a cross-sectional view along view line 7L-7L in FIG. 7K of metal coupon 200, according to other embodiments of the disclosure. Similarly, FIG. 7M shows a perspective view and FIG. 7N shows a cross-sectional view along view line 7N-7N in FIG. 7M of metal coupon 200, according to other embodiments of the disclosure. In these embodiments, metal coupon 200 includes AM metal member 330 having sealed cavity 296 in an interior of AM metal member 330 and porous region 300 around sealed cavity 296. As noted, sealed cavity 296 is hollow, i.e., it is open space or sufficiently open space that includes no discernable pores 302 therein. In FIGS. 7K-N, porous region 300 can take any form previously described herein, e.g., all one porosity; variable porosity region 312 with increasing and/or decreasing porosity; variable porous region 312 with porous sub-regions 314 (three shown in FIG. 7L), among other formats.

As noted previously relative to FIGS. 7A-J, metal coupon 200 may include parts 292 with sealed cavity sections 294 coupled together using braze material 310 to form sealed cavity 296, i.e., using metal coupon system 290. In FIGS. 7K-N, however, AM metal member 330 of metal coupon 200 is additively manufactured as a single piece. In FIGS. 7K-L, metal coupon 200 further includes an evacuation hole 340 extending from sealed cavity 296 to exterior surface 306 of metal coupon 200, i.e., AM metal member 330. Evacuation hole 340 is configured for removing material 362 (FIG. 8B) from within (to-be) sealed cavity 296, e.g., after additive manufacturing. The material 362 (FIG. 8B) to be removed may include any material used to form sealed cavity 296, e.g., any material or structure to support sintered metal powder layers during the additive manufacturing. The material 362 (FIG. 8B) may include, for example, un-melted metal powder or other structure removable through evacuation hole 340. Other structure may include a sacrificial support capable of supporting metal layers of AM metal member 330. Where metal powder is used, evacuation hole 340 may be formed by leaving layers of un-melted metal powder that can be removed to leave evacuation hole 340, e.g., by shaking metal coupon 200 or applying a vacuum (see FIG. 8B) or gas stream to the area where evacuation hole 340 is located. Once material 362 (FIG. 8B) is removed, evacuation hole 340 may be sealed. For example, as shown in FIGS. 7K-L, metal coupon 200 may further include a sealing element 342 in evacuation hole 340 sealing evacuation hole 340. Sealing element 342 may include any now known or later developed structure to seal a coupon opening, such as but not limited to: a limited application of braze material 310 insufficient to fully fill evacuation hole 340 or fill sealed cavity 296; a plug brazed into place; or a spot weld. Evacuation hole 340 can be located anywhere in metal coupon 200 and can have any path (other than linear as shown) desired so long as material 362 (FIG. 8B) can be removed from sealed cavity 296 and evacuation hole 340. Note, a location of evacuation hole 340 may be in a location in exterior surface 306 of metal coupon 200 that ultimately faces into coupon opening 204, such that it is not in an exterior surface of metal coupon 200 in an operative state in component 202.

With reference to FIGS. 7M-N, metal coupon 200 includes AM metal member 330 having sealed cavity 296 in an interior of AM metal member 330, and porous region 300 around sealed cavity 296. As noted, sealed cavity 296 is hollow, i.e., it is open space or sufficiently open space that it includes no discernable pores 302 therein. In FIGS. 7M-N, AM metal member 330 of metal coupon 200 is additively manufactured as a single piece. Here, metal coupon 200 includes sealed cavity 296 therein, but does not include an evacuation hole as in FIGS. 7K-L. Sealed cavity 296 may be formed in any now known or later developed manner capable of forming a sealed cavity in AM metal structure 330 without an evacuation hole, for example, perhaps with some metal powder remaining therein.

In FIGS. 7A-N, metal coupon 200 is shown having a shape configured to be positioned in, as shown in FIGS. 3 and 4, coupon opening 204 in trailing edge 158 or 184 of blade 132 or nozzle 126, respectively. It is emphasized, however, that metal coupons 200 can be employed in any coupon opening 204 in any part of body 206 of any component 202 and can have a large variety of alternative shapes to fit coupon opening 204.

Referring to FIGS. 3, 4, 5, 7A-N and 8A-F, embodiments of a method according to the disclosure will now be described. The method may include repairing a component 202. FIGS. 8A-F show perspective views of the method according to embodiments of the disclosure.

Figure 8B:
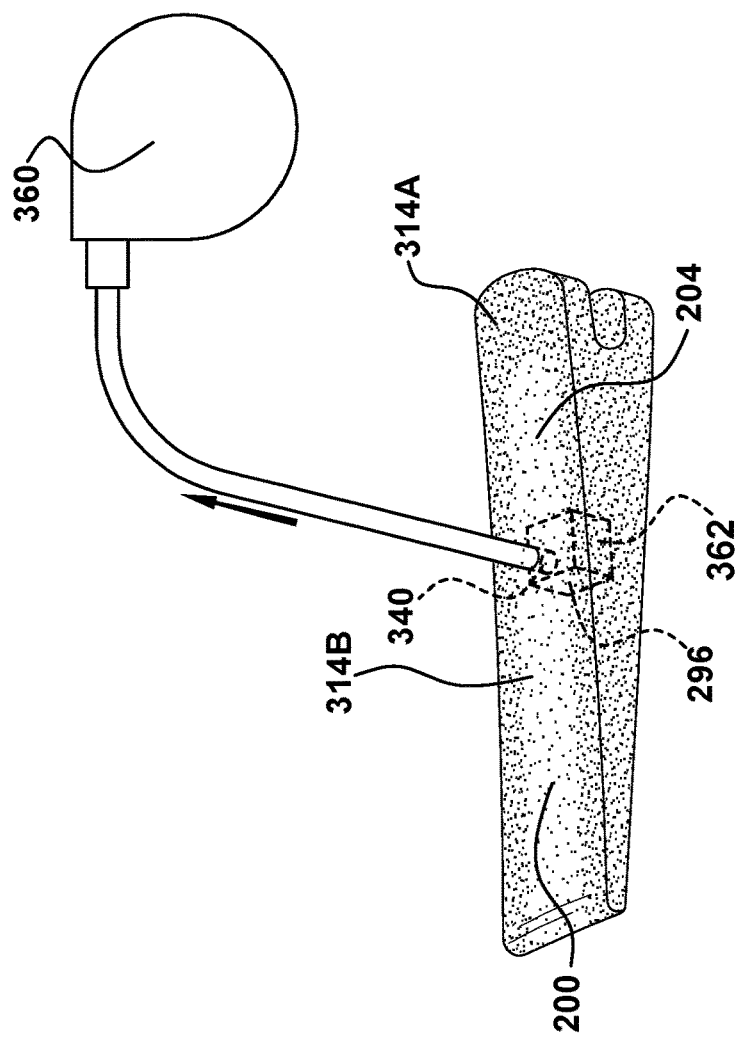
FIGS. 8A-F show perspective views of methods according to various embodiments of the disclosure.
Figure 8A:
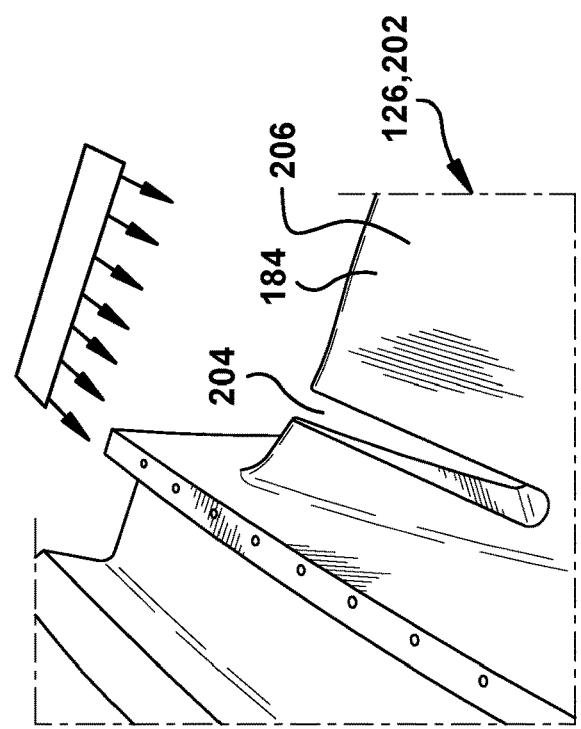

FIG. 8A shows creating coupon opening 204 in body 206 of component 202. Coupon opening 204 eventually receives a metal coupon 200, i.e., parts 292 to form metal coupon 200 or a single-part metal coupon 200. Coupon opening 204 may have any shape desired. In certain applications, coupon opening 204 is created by removing a damaged part of body 206 of component 202, but coupon opening 204 can also be in an original version of component 202, e.g., at a location that is challenging to manufacture with the rest of component 202. In the non-limiting example shown, coupon opening 204 is in a trailing edge 184 of a nozzle 126. FIG. 8A also shows creating a model of coupon opening 204. The model creating may include using any now known or later developed three-dimensional scanner (not shown, see arrows) to scan and create a digitized representation of coupon opening 204 relative to body 206 of component 202. As the process of scanning and modeling a part is well known in the art, further details are omitted so the reader can focus on the salient aspects of the disclosure.

FIGS. 5 and 7A-N show additively manufacturing metal coupon 200. Metal coupon 200 can be additively manufactured in parts or as a single object. As shown in FIGS. 5 and 7A, the additive manufacturing may include additively manufacturing one or more metal parts 292. Each metal part 292 includes at least a section 294 of (to-be) sealed cavity 296 and porous region 300 around section(s) 294 of sealed cavity 296. As shown in FIGS. 5, 7K and 7M, the additive manufacturing may include additively manufacturing an entirety of sealed cavity 296 in a single-part metal coupon 200.

FIG. 7A shows porous region 300 around section(s) 294A-B of sealed cavity 296 in parts 292A-B, and FIGS. 7K and 7M show porous regions 300 around a complete sealed cavity 296. As shown in FIG. 7A-C, the additive manufacturing may include forming the at least section 294 of sealed cavity 296 within barrier 304, where porous region 300 is outside of barrier 304. FIGS. 7A-C show forming metal coupon 200 with a single porosity (but not solid), and, for example, FIG. 7D shows forming metal coupon 200 with variable porosity region 312 with two or more porous sub-regions 314 having different porosities. Variable porosity region 312 may include a gradually changing porosity between sealed cavity 296 and exterior surface 306 of metal coupon 200. As shown, for example, in FIG. 7I, the additive manufacturing may include forming porous region 300 with outer porous sub-region 314A adjacent exterior surface 306 of metal coupon(s) 200 that has a higher porosity than inner porous sub-region 314B of metal coupon(s) 200 near the at least section 294 of sealed cavity 296. Other porosity arrangements for porous region 300, as described herein, may also be used with parts 292.

FIGS. 7K-L show additively manufacturing a single-part metal coupon 200 with evacuation hole 340 extending from sealed cavity 296 to exterior surface 306 of single-part metal coupon 200 and configured to remove material from within sealed cavity 296. FIGS. 7M-N show additively manufacturing an entirety of sealed cavity 296 in single-part metal coupon 200.

The additive manufacture may include any AM process described herein to manufacture porous metal coupon(s) 200 or parts 292 thereof (or dense or solid regions). The additive manufacturing may include manufacturing metal coupon(s) 200 to generally match profile (e.g., shape, dimension, etc.) of coupon opening 204, or to have a near net shape of coupon opening 204 based on the model of coupon opening 204. That is, the additive manufacturing may include forming parts 292 that collectively form metal coupon 200 or may include forming a single-part metal coupon 200. As used herein, "near net shape" indicates metal coupon 200 (with parts 292 that form AM metal member 330 or a single AM metal member 330) has an outer shape after manufacture that, when positioned in coupon opening 204, is very close to surface(s) of body 206 that need repair, that is, portion(s) of body in need of a metal coupon 200 coupled in coupon opening 204. For example, the product may require minimal required finishing methods, like machining or grinding. The use of porous region 300 in metal coupon 200, however, accommodates greater joint gap dimensional variance compared to solid coupons with narrow gaps for braze material because the porous regions provide improved braze material grasp and hold despite the larger gaps. While metal coupon 200 is shown in FIGS. 8A-H as being additively manufactured with the shapes from, for example, the FIGS. 7B, 7K and 7M embodiments, it may take any form described herein.

In accordance with embodiments of the disclosure, porosity of porous region 300, or sub-regions 314, in metal coupon 200 is controlled, i.e., customized, to control flow of braze material 310 therein during a subsequent brazing process that couples metal coupon(s) 200 into coupon opening 204 (FIGS. 3-4, 8E-F) in body 206 (FIGS. 3-4, 8E-F) of component 202 (FIGS. 3-4, 9A-D). Each porous region 300 or sub-regions 314 may be customized in terms of any of the afore-described characteristics that impact porosity. The additive manufacturing may also include forming sealed cavity 296 within barrier 304 with porous region 300 outside of barrier 304. As noted, where provided, barrier 304 prevents braze material 310 infiltration. In addition, a shape and/or location of porous regions 300 or sub-regions 314 can be arranged to direct braze material as desired. For example, in FIGS. 7A-B, an entirety of metal coupon 200 includes a uniform porous region 300 so braze material 310 would be distributed uniformly therein. In contrast, in FIG. 7D, metal coupon 200 includes outermost porous sub-region 314A near an edge 308 of metal coupon 200 where it would couple with coupon opening 204 (FIGS. 3-4) and a different porous sub-region 314B with a different porosity near sealed cavity 296, e.g., distal from edge 308. In this manner, braze material 310 would be distributed in different ways in each porous sub-region 314, resulting in different physical characteristic(s) of metal coupon 200 in different regions thereof. More particularly, any number of different porous sub-regions can be used to create at least one different physical characteristic in component 202 that includes metal coupon 200, such as: joint adhesive bond strength, stress/strain resistance, ductility, wear resistance, oxidation resistance, thermal conductivity, electrical conductivity, surface roughness, hardness, and/or mass. In a non-comprehensive list of possibilities, metal coupon 200 may include a higher porosity in one porous sub-region 314 to direct more braze material therein through capillary action compared to other solid regions of metal coupon 200 to control at least one physical characteristic of component 202. In another embodiment, metal coupon 200 may include a lower porosity in one porous sub-region 314 to direct less braze material therein through capillary action compared to other solid regions of metal coupon 200 to control at least one physical characteristic of component 202. In other embodiments, metal coupon(s) 200 may include two or more porous sub-regions 314 that collectively make up an entirety of metal coupon 200. Any arrangement of porous sub-regions 314 is possible to create the desired braze material flow and infiltration.

In certain embodiments, the additive manufacturing may also include forming any variety of improvements for component 202 including, for example, structures not previously present in component 202. Component 202 may be an original component in need of improvements or a component including a removed or damaged part. For example, as shown in FIG. 7B, the additive manufacture may optionally include forming a cooling passage 350 in metal coupon 200. Cooling passage 350 may extend in metal coupon 200 in any manner, e.g., in a serpentine path therein or extending through external surface 306 of metal coupon 200. In another example, not shown, the additive manufacture may optionally include forming one or more support and/or cooling structures (e.g., pin/fins) (perhaps with cooling passages (not shown)) therein in metal coupon 200. Any advantageous internal structural changes can be made in metal coupon(s) 200. Any now known or later developed post-additive manufacture finishing processing may be optionally performed on metal coupon(s) 200, e.g., abrading to smooth surfaces thereof. Advantageously, however, teachings of the disclosure remove the need for certain finishing processes of metal coupon 200 in component 202, such as but not limited to: peening, heat treatment, and hot isostatic pressing (HIP).

FIG. 8B shows an optional step where (to-be) sealed cavity 296 includes material 362 to be removed prior to braze material infiltration. In this situation, the method may further include removing material 362 from within sealed cavity 296 using evacuation hole 340. Material 362 may be removed using any means, such as but not limited to a vacuum system 360 for removing un-melted metal powder from (to be) sealed cavity 296. FIGS. 7K-L show sealing evacuation hole 340 with sealing element 342. As noted, sealing element 342 may include any now known or later developed structure and/or material to seal an opening, such as but not limited to: a limited application of braze material 310 insufficient to reach sealed cavity 296, a plug brazed into place, or a spot weld.

Figure 8D:
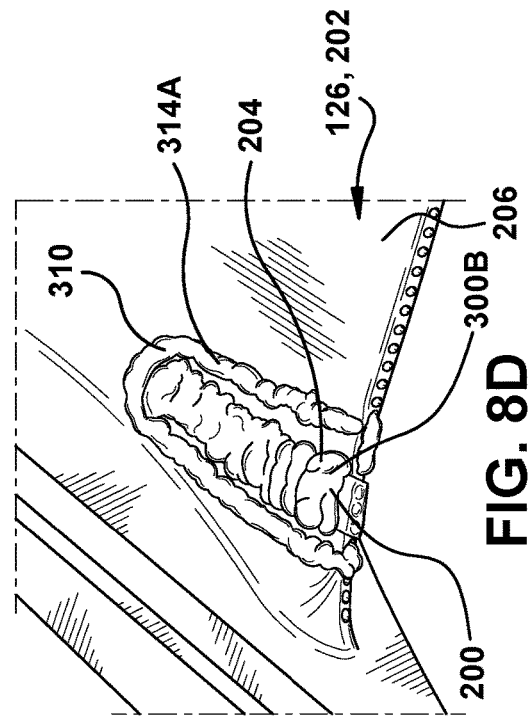
Figure 8F:
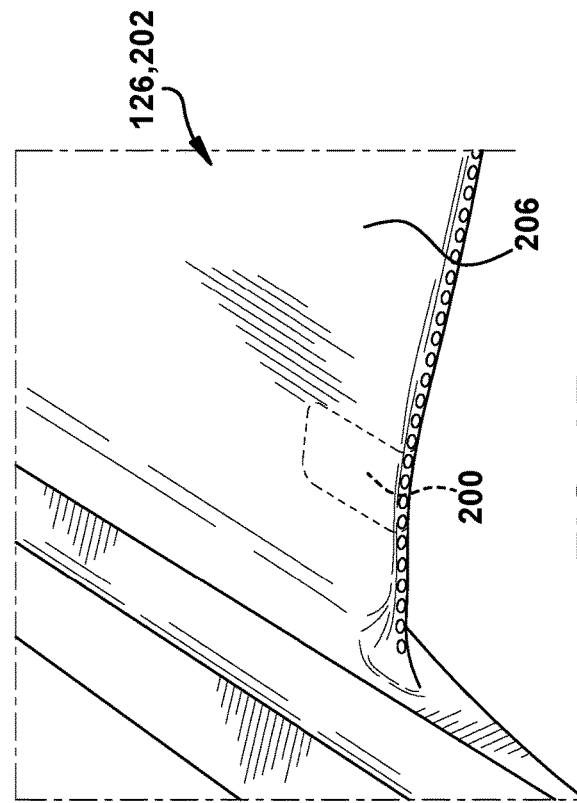
Figure 8C:
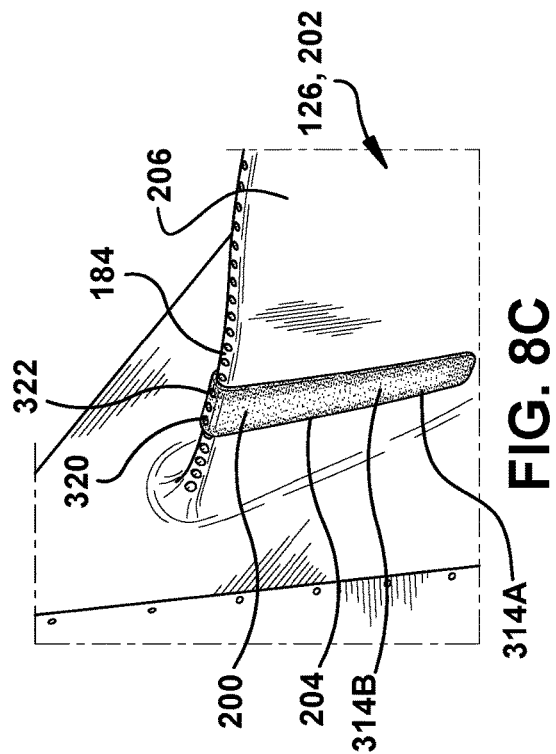

FIGS. 8C and 8D show positioning metal coupon 200 in coupon opening 204 in body 206 of component 202. Metal coupon 200 may be positioned in coupon opening 204 in body 206 in any now known or later developed manner, e.g., using manual press fitting of slip fitting. Where parts 292 are used, the positioning may include positioning the two or more metal parts 292 in coupon opening 204 to, collectively, provide metal coupon 200. Where metal coupon 200 is formed in its entirety as a single piece, the positioning includes positioning single-part metal coupon 200 in coupon opening 204. Where necessary, parts 292 of metal coupon 200 or single-part metal coupon 200 may be held in place in any desired manner, e.g., adhesive, nickel-chromium tack welds, ball tacks, resistance weld, fusion tack weld, male-female connectors 354 (FIG. 7A), clamps, etc.

Figure 8E:
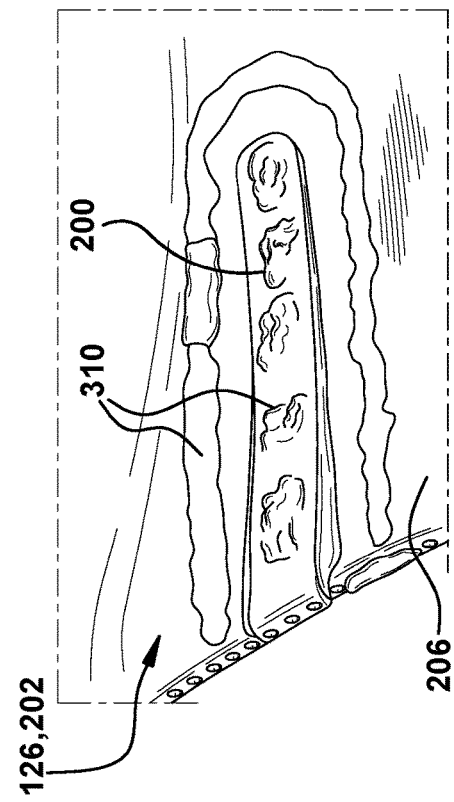

FIGS. 8E-F show infiltrating metal coupon 200 with braze material 310 to couple the metal coupon, i.e., coupon with parts 292 or single-part metal coupon, in coupon opening 204 in body 206 with sealed cavity 296 formed therein, i.e., by performing a brazing process. Where a single-part metal coupon 200 is used, the infiltrating includes infiltrating the single-part metal coupon to couple it in coupon opening 204 in body 206 with sealed cavity 296 therein, i.e., performing a brazing process. Where a multi-part metal coupon 200 is used, the infiltrating also couples parts 292 together. Braze material 310 may include any now known or later developed brazing composition, such as but not limited to: GE (Alstom) B1P, Amdry™ D15, DF4B, or BRB, some of the formulations of which are listed in the following table:

| Alloy | Ni | Cr | Co | B | Al | Ta | Y |
|---|---|---|---|---|---|---|---|
| Amdry™ D15 | 65.10 | 15.30 | 10.30 | 2.30 | 3.50 | 3.50 | 0.00 |
| Amdry™ BRB | 70.50 | 14.00 | 9.00 | 2.50 | 4.00 | 0.00 | 0.00 |
| Amdry™ DF4B | 67.15 | 14.00 | 10.00 | 2.75 | 3.50 | 2.50 | 0.10 |

The infiltrating may include any now known or later developed brazing process such as using a vacuum brazing system, induction brazing system, and/or inert gas atmosphere heating system and related techniques. In one non-limiting example, the brazing may include, for example, applying braze material 310 (FIG. 8D) and applying heat (FIG. 8E) to cause it to flow into, through and around metal coupon 200 through capillary action.

The infiltrating also injects braze material 310 into porous region 300 of metal coupon 200 creating sealed cavity 296. The infiltrating may inject braze material 310 into single-part metal coupon 200 or parts 292 that form a multi-part metal coupon 200. Braze material 310 infiltrates and seals porous region 300 around sealed cavity 296 and seals any seams 332 (FIGS. 7B-D, 7I-J) where two or more parts 292 are used. Sealed cavity 296 is hollow, as described herein. The infiltrating of braze material 310 is based at least on a characteristic of the porosity or porosities of porous region 300. For example, as further shown in FIG. 7I, the infiltrating may include causing braze material 310 to travel through and infiltrate porous region 300. The porosity of porous region 300 dictates how braze material 310 flows. For example, as shown in FIG. 7I, the infiltrating may include causing braze material 310 to travel through and infiltrate an outer porous sub-region 314A based on the characteristic of a porosity of outer porous sub-region 314A (that is, a first porosity), and travel through and infiltrate second, inner porous sub-region 314B based on the characteristic of its second porosity (i.e., a second porosity). As shown in FIG. 7D, where variable porosity sub-region 312 is present with two or more porous sub-regions 314 having different porosities, braze material 310 may travel through and infiltrate variable porosity region 312 based on characteristic(s) of variable porosity sub-region 312 (e.g., gradient of the porosity, stepped porosity, among other things). As shown in FIG. 7I, where variable porosity region 312 includes and is between inner and outer porous sub-sub-regions 314A-B, the infiltrating may include causing braze material 310 to travel through and infiltrate outer porous sub-region 314A based on the characteristic of its first porosity, travel through and infiltrate variable porosity region 312 between sub-regions 314A-B based on characteristic(s) of that variable porosity region 312 (e.g., gradient of the porosity, stepped porosity, among other things), and travel through and infiltrate inner porous sub-region 314B based on the characteristic of its second porosity. Where barrier 304 is present, it prevents braze material 310 from entering sealed cavity 296. Where barrier 304 is not present, the brazing process may be controlled to limit the infiltrating of braze material 310 and prevent it from reaching sealed cavity 296. Here, as shown in FIG. 7J, seal cavity 296 is sealed by braze material 310 approaching but not entering the cavity, leaving some of porous region 300 without braze material 310 therein around sealed cavity 296.

The option of different porosities in porous region 300 results in different braze material 310 flow and infiltration. As a result of the brazing process, porous region 300 or sub-regions 314 of different porosities with braze material 310 therein may have at least one different physical characteristic. In one example, shown in FIG. 7D, the porosity of a first, outer porous sub-region 314A may be higher (i.e., less dense) than the porosity of second, inner porous sub-region 314B. In this case, infiltrating includes infiltrating first, outer porous sub-region 314A with more braze material 310 than second, inner porous sub-region 314B. Depending on the amount of braze material 310 used, among other factors, the different porosities allow for customization of at least one physical characteristic of component 202, such as: joint adhesive bond strength, stress/strain resistance, ductility, wear resistance, oxidation resistance, thermal conductivity, electrical conductivity, surface roughness, hardness, and/or mass. Further, the shape and size of sealed cavity 296 allows customization in terms of mass, e.g., by removing material that may not be necessary. In addition, the multi-flow paths for braze material 310 using porous regions 300 may decrease the likelihood of a lack of fill and/or voids along a brazed joint compared to the conventional narrow gap-filling brazing process, and due to tight manufacturing tolerances required for narrow gap brazing.

In certain embodiments, different braze materials 310 may be used in different parts of metal coupon(s) 200, providing further customization of the coupling of metal coupon(s) 200 in component 202. For example, referring to FIG. 9C, a first braze material 310A may be used on a first metal part or side 326 of component 202 and another braze material 310B, different than first braze material 310A, may be used on a different part or side 328 of component 202. In one example, referring to FIGS. 3, 4 and 9A-D, first metal part or side 326 of component 202 may be a first (concave, pressure) side outer walls 152, 178 of airfoil 150, 176 and second or side 328 of component 202 may be a second (convex, suction) side outer walls 154, 180 of an airfoil 150, 176. The different braze materials 310A, 310B, in addition to different porous regions 300, on the different part or sides 326, 328 can be customized for the anticipated environment of component 202 at those locations. As will be recognized, the number of variations of braze materials and/or porous regions/sub-regions are very large, making it possible to address a wide variety of difficult repair situations.

Other embodiments of a method according to the disclosure may include just forming one or more metal coupons 200 for repairing component 202. In this case, as shown in FIG. 8A, the method includes creating a model of coupon opening 204 in body 206 of component 202, and additively manufacturing metal coupon(s) 200, as described herein.

Any now known or later developed post-manufacture finishing processing may be optionally performed on metal coupon(s) 200, e.g., peening, heat treatment, hot isostatic pressing (HIP), among others. FIG. 8F shows illustrative optional finishing steps for component 202, such as machining to make a surface of component 202 seamlessly transition where metal coupon 200 was added. It is noted, however, the teachings of the disclosure may remove the need for other finishing steps typically used to address residual stresses present in the material post additive manufacturing, e.g., peening, heat treatment, hot isostatic pressing (HIP), among others.

Figure 9A:
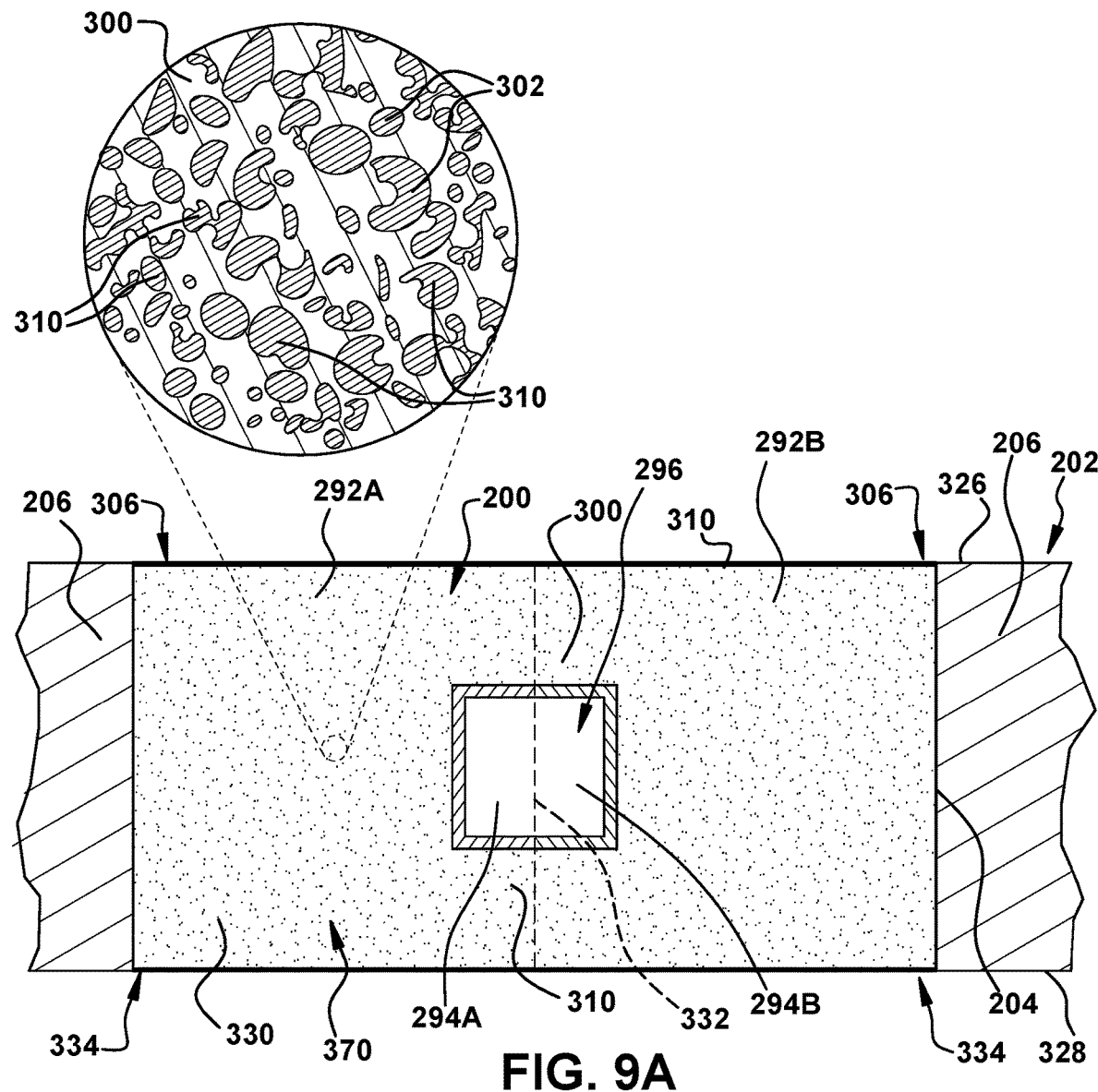
FIGS. 9A-D show enlarged cross-sectional views of a metal coupon in a coupon opening in a body of a component according to embodiments of the disclosure.
Figure 9B:
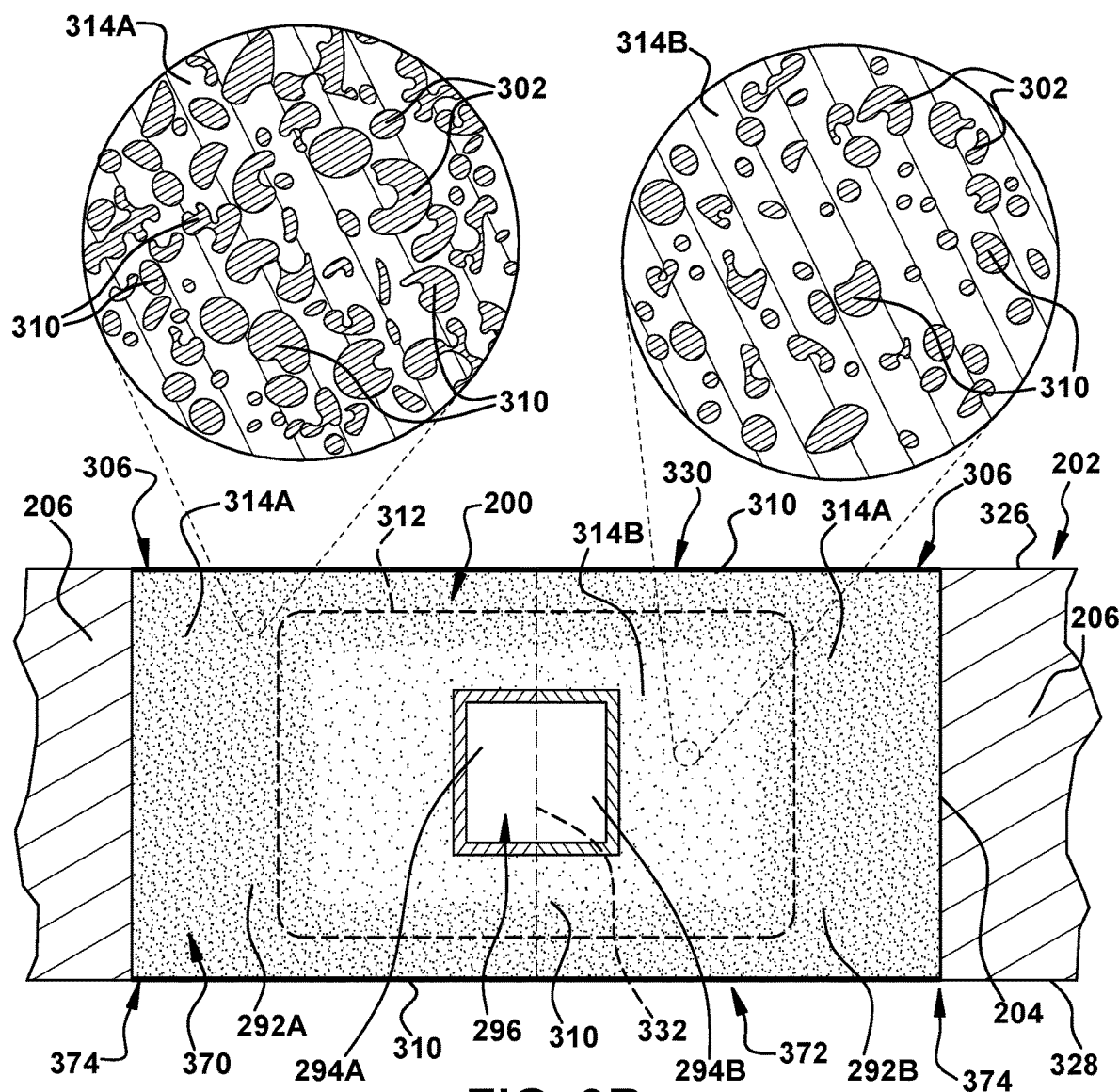
Figure 9C:
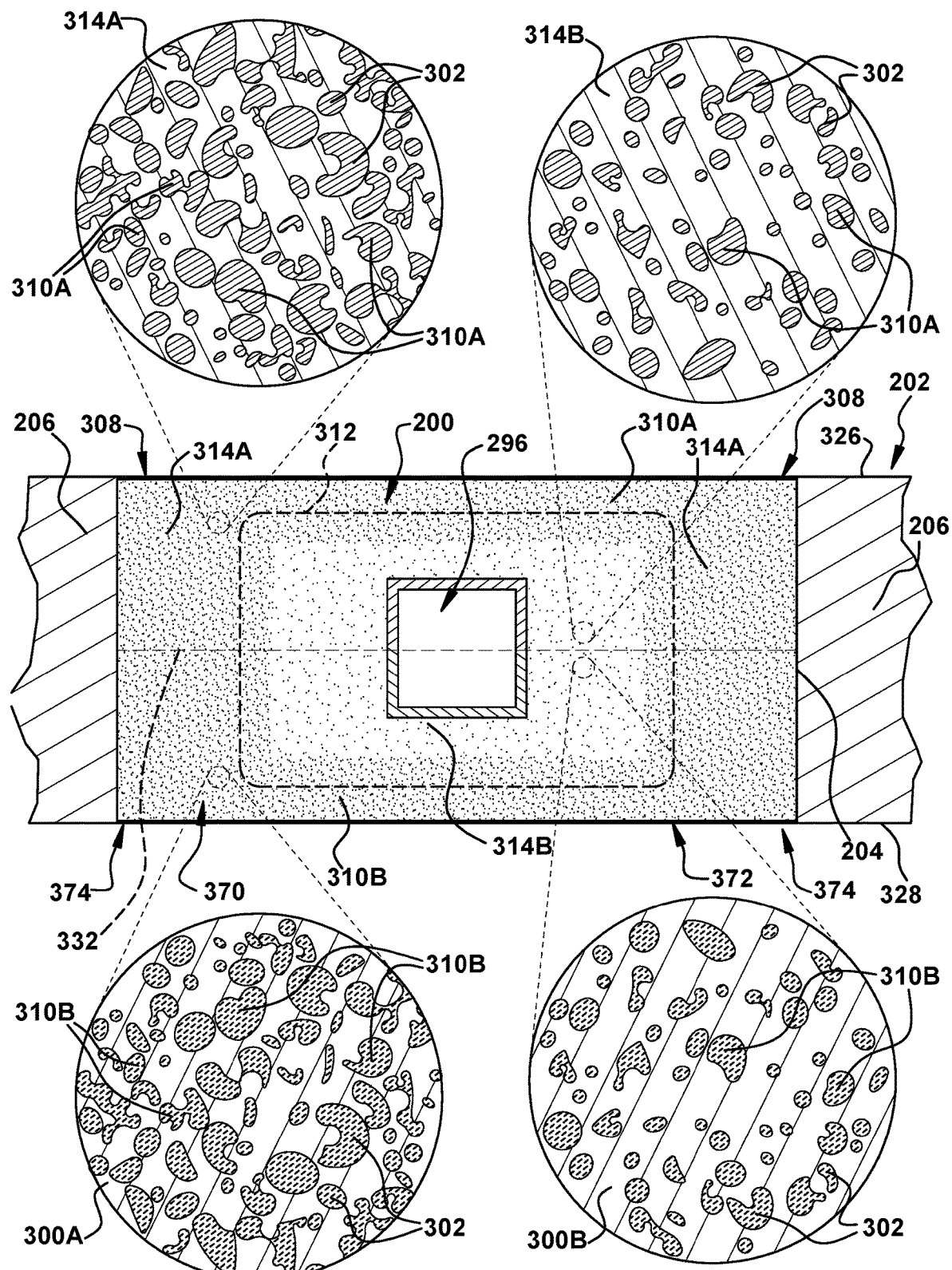
Figure 9D:
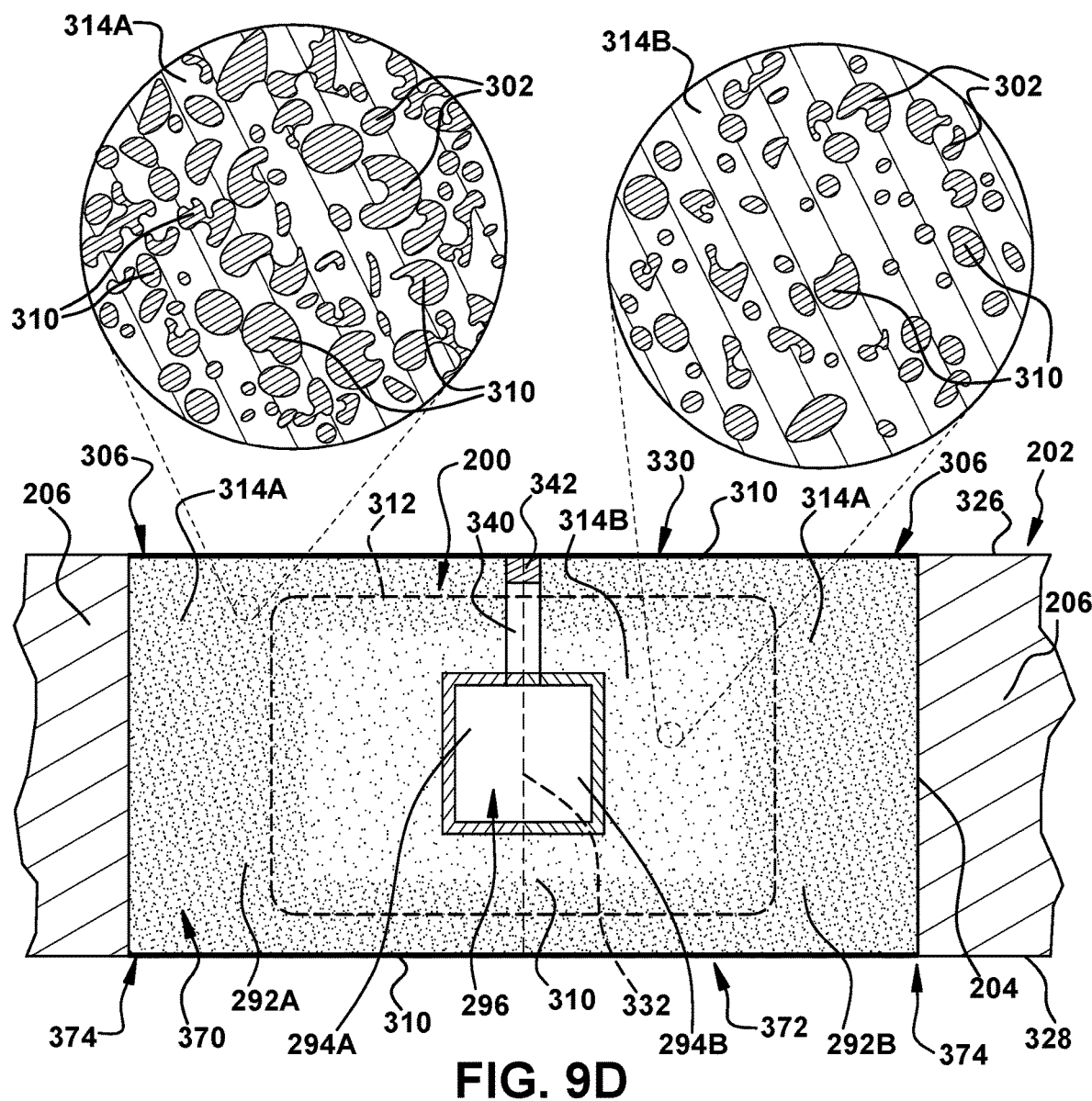

FIGS. 3, 4 and 9A-D show embodiments of a component 202 according to embodiments of the disclosure. FIGS. 9A-D show enlarged cross-sectional views of metal coupon 200 with sealed cavity 296 in coupon opening 204 of body 206 of component 202. FIGS. 9A and 9D show component 202 with metal coupon 200 with a single porous region 300, FIG. 9B shows component 202 with metal coupon 200 having two or more porous sub-regions 314A, 314B, and FIG. 9C shows component 202 with metal coupon 200 having two or more porous sub-regions 314A, 314B and one or more different braze materials 310A, 310B. FIG. 9D also shows component 202 with metal coupon 200 with sealed evacuation hole 340 to sealed cavity 296. While particular arrangements of porous region 300 from FIGS. 7A-N are shown in FIGS. 9A-D, it will be recognized that any metal coupon 200 embodiment described throughout the current disclosure may be used in component 202.

Referring to FIGS. 9A-D, component 202 includes body 206. As noted herein, body 206 can have any form for the particular industrial application in which component 202 is used. In the examples used herein, body 206 is for a turbine rotating blade 132 (FIG. 3) or a turbine stationary nozzle 126 (FIG. 4). While metal coupon 200 is shown in an airfoil 150, 176 of blade 132 and nozzle 126 in FIGS. 3 and 4, respectively, metal coupon 200 can be in any part of body 206 of component 202. Component 202 also includes additively manufactured (AM) metal coupon 200 having sealed cavity 296 in an interior thereof and porous region 300 around sealed cavity 296. Sealed cavity 296 is hollow, as described herein. Braze material(s) 310 couple metal coupon 200 in coupon opening 204 in body 206 and infiltrates porous region 300. Component 202 may also include sealed cavity 296 defined within braze material infiltration barrier 304. Porous region 300 is outside of barrier 304.

As described herein, metal coupon 200 can be optionally built in parts 292 (FIG. 7A). As indicated by dashed lines in FIGS. 9A-C, metal coupon 200 may include a first metal part 292A including a first section 294A of sealed cavity 296 defined therein and a second metal part 292B including a second section 294B of sealed cavity 296 defined therein. Braze material 310 couples first metal part 292A and second metal part 292B of metal coupon 200 in coupon opening 204 in body 206, creating sealed cavity 296. FIG. 9D shows metal coupon 200 further including evacuation hole 340 extending from sealed cavity 296 to exterior surface 306 of metal coupon 200, i.e., AM metal member 330, i.e., for where a single-part metal coupon 200 is used. Evacuation hole 340 was configured to remove material 362 (FIG. 8B) from within sealed cavity 296. Sealing element 342 couples to evacuation hole 340 to seal the evacuation hole.

As shown in FIG. 9A, braze material 310 includes a first section 370 infiltrated into first, outer porous sub-region 314A based at least on a characteristic of a first porosity of outer porous sub-region 314A. As shown in FIG. 9B, metal coupon 200 further includes second, inner porous sub-region 314B having a second porosity different than the first porosity. The first porosity may be different from the second porosity in terms of at least one of the following characteristics: percentage of open space volume to total volume, pore shape, pore size, number of pores, and/or pore connectivity. "At least on a characteristic" of the porosity indicates that the porosity can result in different infiltration characteristics, such as braze material volume, pattern within the porosity, crystallization, among other characteristics. However, as understood in the art, other factors can also impact the infiltration characteristics such as the type of braze material and characteristics of the brazing process such as but not limited to: temperature, pressure, positioning of component 202 and/or the format and arrangement of metal coupon 200. Body 206 may have a third porosity different than one or both of the first porosity and second porosity. For example, body 206 may have a third porosity denser than both first porosity and second porosity, e.g., it can be 100% solid. In addition, barrier 304 may have a different porosity, as described herein. For example, barrier 304 may have the same third porosity as body 206 or another porosity capable of preventing braze material 310 from flowing therethrough. Optionally, metal coupon 200 may include a variable porosity region 312, 313 with two or more porous sub-regions 314 (sub-regions only shown by dashed boxes in FIG. 9B for clarity) between (and possibly including part of) first, outer porous sub-region 314A and second, inner porous sub-region 314B. The variable porosity region 312 may gradually change porosity between first and second porosities, e.g., in a stepped or incremental manner. For example, as shown for example in FIG. 7D, a porosity of porous region 300 may increase in defined, incremental steps (via porous sub-regions 314) from sealed cavity 296 towards exterior surface 306 of metal coupon 200. As described herein, in certain cases, a porosity of the porous region 300 may increase from sealed cavity 296 towards exterior surface 306 of metal coupon 200, e.g., so more braze material 310 is in a more outer porous sub-region, e.g., 314A (FIG. 7I) of metal coupon 200 in component 202.

In FIG. 9C, braze material 310B includes a second section 372 infiltrated into second, outer porous sub-region 314B based at least on a characteristic of the second porosity. The consequence of the different porosities is that first, outer porous sub-region 314A and second, inner porous sub-region 314B with braze material(s) 310 therein have at least one different physical characteristic. The porosities can be customized to select those physical characteristics inasmuch as the porosities can impact those physical characteristics. In one example, the first porosity of first, outer porous sub-region 314A may be higher (i.e., less dense) than the second porosity of second, inner porous sub-region 314B, and first, outer porous sub-region 314A includes more braze material 310 therein than second, outer porous sub-region 314B. As shown in FIG. 7I, porous region 300 may include outer porous sub-region 314A adjacent exterior surface 306 of metal coupon 200 that has a higher porosity than inner porous sub-region 314B near sealed cavity 296, e.g., within 0.5 millimeters. In this case, outer porous sub-region 314A includes more braze material 310 therein than inner porous sub-region 314B. In another example, shown in FIG. 9B, first, outer porous sub-region 314A is in at least part of an edge of metal coupon 200 configured for joining to body 206. Also, second, outer porous sub-region 314B may be adjacent to first, outer porous sub-region 314A. Alternatively, second, outer porous sub-region 314A may also be adjacent at least (another) part of edge of metal coupon 200, and perhaps adjacent first, outer porous sub-region 314A. This arrangement, as shown in FIG. 9B, may be advantageous to place more braze material 310 near a braze joint 374 to strengthen the joint adhesive bond strength of metal coupon 200 in coupon opening 204 in body 206, or it may allow for less oxidation at braze joint 374 or greater thermal conductivity at braze joint 374. Any of the physical characteristics described herein can also be customized based on the different porosities and/or different braze materials. As noted, depending on the braze material 310 used, the different porosities may allow for customization of physical characteristic(s) of component 202, such as: joint adhesive bond strength, stress/strain resistance, ductility, wear resistance, oxidation resistance, thermal conductivity, electrical conductivity, surface roughness, hardness, and/or mass. As noted, metal coupon 200 may have a near net shape of coupon opening 204 in body 206 of component 202.

While particular locations of different porous regions 300 and/or sub-regions 314 have been illustrated herein, it is emphasized that the different porous regions or sub-regions can be arranged in any manner to provide different braze material infiltration characteristics and different physical characteristics of component 202.

Embodiments of the disclosure may also include, as shown in FIGS. 1-2, turbomachine 100 including turbine assembly 110, and at least one component 202, as described herein. Component(s) 202 may take the form turbine stationary nozzle(s) 126, turbine rotating blade(s) 132 or other components of turbomachine 100. Metal coupon 200 can be used in a newly manufactured component or in a component in need of repair.

The disclosure provides various technical and commercial advantages, examples of which are discussed herein. For repairs or improvements of components, additive manufacturing allows cost-effective creation of metal coupons with custom-fitted shapes where only damaged material needs to be removed. Porous regions or sub-regions may provide a higher percentage of a base metal alloy (e.g., >60%) in certain areas that may result in improved physical characteristics compared to, e.g., pre-sintered preforms. Porous regions or sub-regions may also provide a welded/fused particle matrix (e.g., with a superalloy metal base) with braze material fill which is stronger compared to conventional metal particles surrounded by braze material. Multi-flow paths for the braze material using multiple porous regions or sub-regions may also decrease the likelihood of a lack of fill and/or voids along a brazed joint compared to the conventional narrow gap-filling brazing process. Porous regions or sub-regions can be formed with varying porosity/density across metal coupon to allow for highly customized braze material flow. Porous regions or sub-regions also accommodate greater joint gap dimensional variance compared to machined solid coupons with narrow gaps for braze material. For those repairs in which the base metal powder for the metal coupon is expensive, overall coupon/repair material costs can be controlled via careful design of its porosity (selection of the ratio of the braze material to the metal of the coupon) and the size of the sealed cavity. Similarly, the overall mass of the metal coupon can be controlled via control of the size of the sealed cavity.

Approximating language, as used herein throughout the specification and claims, may be applied to modify any quantitative representation that could permissibly vary without resulting in a change in the basic function to which it is related. Accordingly, a value modified by a term or terms, such as "about," "approximately" and "substantially," are not to be limited to the precise value specified. In at least some instances, the approximating language may correspond to the precision of an instrument for measuring the value. Here and throughout the specification and claims, range limitations may be combined and/or interchanged; such ranges are identified and include all the sub-ranges contained therein unless context or language indicates otherwise. "Approximately" or "about," as applied to a particular value of a range, applies to both end values and, unless otherwise dependent on the precision of the instrument measuring the value, may indicate +/−10% of the stated value(s).

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description but is not intended to be exhaustive or limited to the disclosure in the form disclosed. Many modifications and variations will be apparent to those of ordinary skill in the art without departing from the scope and spirit of the disclosure. The embodiments were chosen and described in order to best explain the principles of the disclosure and the practical application and to enable others of ordinary skill in the art to understand the disclosure for various embodiments with various modifications as are suited to the particular use contemplated.

What is claimed is:

1. A metal coupon system for repairing a component, the metal coupon system comprising:
   at least two additively manufactured (AM) metal parts with each AM metal part including at least a section of a sealed cavity therein and a porous region around the at least section of the sealed cavity,
   wherein the at least two AM metal parts combine to form a metal coupon with the sealed cavity in an interior thereof and the porous region around the sealed cavity, wherein the sealed cavity is hollow.

2. The metal coupon system of claim 1, wherein the porous region has a variable porosity with two or more sub-regions having different porosities.

3. A metal coupon for repairing a component, the metal coupon comprising:
   an additively manufactured (AM) metal member having a sealed cavity in an interior of the AM metal member and a porous region around the sealed cavity, wherein the sealed cavity is hollow.

4. The metal coupon of claim 3, wherein the porous region has a variable porosity with two or more porous sub-regions having different porosities.

5. The metal coupon of claim 3, wherein the porous region includes an outer porous sub-region adjacent an exterior surface of the AM metal member that has a higher porosity than an inner porous sub-region near the sealed cavity, wherein the outer porous sub-region is configured to accept more braze material therein than the inner porous sub-region.

6. The metal coupon of claim 3, wherein the sealed cavity is defined within a braze material infiltration barrier, wherein the porous region is outside of the braze material infiltration barrier.

7. The metal coupon of claim 3, wherein the AM metal member includes a first metal part including a first section of the sealed cavity defined therein and a second metal part including a second section of the sealed cavity defined therein, wherein the first and second metal parts are coupled using a braze material that infiltrates the porous region.

8. The metal coupon of claim 3, wherein the AM metal member further includes an evacuation hole extending from an exterior surface of the AM metal member to the sealed cavity and configured to remove material from within the sealed cavity, and further comprising a sealing element in the evacuation hole to seal the evacuation hole.

9. The metal coupon of claim 3, wherein a porosity of the porous region increases from near the sealed cavity towards an exterior surface of the AM metal member.

10. The metal coupon of claim 3, wherein a porosity of the porous region increases in incremental steps from near the sealed cavity towards an exterior surface of the AM metal member.

11. A component, comprising:
    a body;
    an additively manufactured (AM) metal coupon having a sealed cavity in an interior of the AM metal coupon and a porous region around the sealed cavity, wherein the sealed cavity is hollow; and
    a braze material coupling the AM metal coupon in a coupon opening in the body, the braze material infiltrated into the porous region.

12. The component of claim 11, wherein the porous region has a variable porosity with two or more porous sub-regions having different porosities.

13. The component of claim 11, wherein the porous region includes an outer porous sub-region adjacent an exterior surface of the AM metal coupon that has a higher porosity than an inner porous sub-region near the sealed cavity, wherein the outer porous sub-region is configured to accept more braze material therein than the inner porous sub-region.

14. The component of claim 11, wherein the sealed cavity is defined within a braze material infiltration barrier, wherein the porous region is outside of the braze material infiltration barrier.

15. The component of claim 11, wherein the AM metal coupon includes a first metal part including a first section of the sealed cavity defined therein and a second metal part including a second section of the sealed cavity defined therein, wherein the braze material couples the first metal part and the second metal part of the AM metal coupon in the coupon opening in the body, creating the sealed cavity.

16. The component of claim 11, wherein the AM metal coupon further includes an evacuation hole extending from an exterior surface of the AM metal coupon to the sealed cavity, and further comprising a sealing element in the evacuation hole to seal the evacuation hole.

17. The component of claim 11, wherein a porosity of the porous region increases from the sealed cavity towards an exterior surface of the AM metal coupon.

18. The component of claim 11, wherein a porosity of the porous region increases in incremental steps from the sealed cavity towards an exterior surface of the AM metal coupon.

19. A method of repairing a component, the method comprising:
   additively manufacturing a metal coupon, the metal coupon including a sealed cavity and a porous region around the sealed cavity;
   positioning the metal coupon in a coupon opening in a body of the component; and
   infiltrating the metal coupon with a braze material to couple the metal coupon in the coupon opening in the body with the sealed cavity therein, the braze material infiltrating into the porous region of the metal coupon,
   wherein the sealed cavity is hollow.

20. The method of claim 19, wherein the porous region has a variable porosity with two or more porous sub-regions having different porosities.

21. The method of claim 19, wherein the metal coupon has a near net shape of the coupon opening.

22. The method of claim 19, wherein the additive manufacturing includes forming the porous region with an outer porous sub-region adjacent an exterior surface of the metal coupon that has a higher porosity than an inner porous sub-region of the metal coupon near the sealed cavity, and wherein, after the infiltrating, the outer porous sub-region includes more braze material therein than the inner porous sub-region.

23. The method of claim 19, wherein the additive manufacturing includes forming the sealed cavity within a braze material infiltration barrier, wherein the porous region is outside of the braze material infiltration barrier.

24. The method of claim 19, wherein the additive manufacturing the metal coupon includes additively manufacturing one or more metal parts, each metal part including at least a section of the sealed cavity and the porous region around the at least section of the sealed cavity, and wherein the positioning includes positioning the one or more metal parts in the coupon opening to provide the metal coupon.

25. The method of claim 19, wherein the additive manufacturing includes additively manufacturing an entirety of the sealed cavity in a single-part metal coupon, the positioning includes positioning the single-part metal coupon in the coupon opening, and the infiltrating includes infiltrating the single-part metal coupon.

26. The method of claim 25, wherein the additive manufacturing includes additively manufacturing the single-part metal coupon with an evacuation hole extending from an exterior surface of the single-part metal coupon to the sealed cavity and configured to remove material from within the sealed cavity, and further comprising removing material from within the sealed cavity using the evacuation hole, and further comprising sealing the evacuation hole with a sealing element.

27. The method of claim 19, further comprising, prior to the additive manufacturing:
   creating the coupon opening in the body of the component configured to receive the metal coupon; and
   creating a model of the coupon opening,
   wherein the additive manufacturing includes manufacturing the metal coupon such that the metal coupon has a near net shape of the coupon opening based on the model of the coupon opening.

\* \* \* \* \*